(12) United States Patent
Heo et al.

(10) Patent No.: US 11,211,063 B2
(45) Date of Patent: Dec. 28, 2021

(54) MULTIMEDIA DEVICE FOR PROCESSING VOICE COMMAND

(71) Applicant: LG ELECTRONICS INC., Seoul (KR)

(72) Inventors: Seunghyun Heo, Seoul (KR); Jeongmin Kim, Seoul (KR); Kiwon Park, Seoul (KR); Junku Park, Seoul (KR); Seokwon Seo, Seoul (KR); Dongyoung Lee, Seoul (KR); Jieun Lee, Seoul (KR); Hyangjin Lee, Seoul (KR); Changwook Im, Seoul (KR); Yookyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 16/202,005

(22) Filed: Nov. 27, 2018

(65) Prior Publication Data

US 2020/0168216 A1 May 28, 2020

(51) Int. Cl.
*G10L 15/00* (2013.01)
*G10L 15/22* (2006.01)
(Continued)

(52) U.S. Cl.
CPC ....... *G10L 15/22* (2013.01); *H04N 21/42204* (2013.01); *H04N 21/472* (2013.01);
(Continued)

(58) Field of Classification Search
CPC combination set(s) only.
See application file for complete search history.

(56) References Cited

U.S. PATENT DOCUMENTS

| 2009/0030681 A1* | 1/2009 | Sureka | H04N 21/42203 704/235 |
| 2010/0312547 A1* | 12/2010 | Van Os | G06F 3/167 704/9 |

(Continued)

FOREIGN PATENT DOCUMENTS

| KR | 1020120067680 | 6/2012 |
| KR | 1020150043807 | 4/2015 |

(Continued)

OTHER PUBLICATIONS

PCT International Application No. PCT/KR2018/014709, Notification of Transmittal of the International Search Report and the Written Opinion of the International Searching Authority, or Declaration dated Aug. 28, 2019, 10 pages.

*Primary Examiner* — Vu B Hang
(74) *Attorney, Agent, or Firm* — Lee, Hong, Degerman, Kang & Waimey PC

(57) ABSTRACT

The present invention discloses a multimedia device capable of processing a recognized speech-based command. In one embodiment, the device may include a memory to store at least one application therein; an application manager for executing any of the at least one application stored in the memory; and a controller configured to receive from the application manager a list of at least one recognized speech-based command that can be executed by the executed application, wherein the controller is configured: to control a network interface module to transmit any speech-based data received from an outside and the list to the server; and to control the executed application or execute a function non-specific to the currently-executed application, based on a feedback result value received from the server via the network interface module.

10 Claims, 24 Drawing Sheets

(51) Int. Cl.
*H04N 21/422* (2011.01)
*H04N 21/472* (2011.01)
*G10L 15/08* (2006.01)

(52) U.S. Cl.
CPC ........ *G10L 15/08* (2013.01); *G10L 2015/223* (2013.01); *G10L 2015/225* (2013.01)

(56) References Cited

U.S. PATENT DOCUMENTS

| | | | |
|---|---|---|---|
| 2011/0313775 A1* | 12/2011 | Laligand | H04N 21/4355 |
| | | | 704/275 |
| 2014/0188482 A1* | 7/2014 | Chang | G10L 15/00 |
| | | | 704/275 |
| 2020/0041300 A1* | 2/2020 | Min | H04L 67/143 |

FOREIGN PATENT DOCUMENTS

| KR | 1020150077580 | 7/2015 |
|---|---|---|
| KR | 101828273 | 2/2018 |
| KR | 1020180022021 | 3/2018 |

\* cited by examiner

FIG. 14

| Type | Metadata used for speech recognition |
|---|---|
| Type 1 | Information about Broadcast that user is watching (For example, program name, genre name, channel name, cast, play time, etc.) |
| Type 2 | Information about users' past viewing history (For example, frequently viewed programs, genres, channels, actor names) |
| Type 3 | Information about currently-executed application (For example, ①App ID, App name, App genre, ② Clickable item in App ③ information being played on App) |
| Type 4 | State information of TV (For example, ① region, language information, etc. ② Installed app) |
| Type 5 | previously-recognized speech |

MULTIMEDIA DEVICE FOR PROCESSING VOICE COMMAND

BACKGROUND OF THE INVENTION

Field of the Invention

The present invention relates to a multimedia device for processing voice command. The multimedia device can be a STB (Set Top Box), a mobile terminal, an analog television, a digital television, a smart television, a flexible television for having a voice recognition function, and so on.

Discussion of the Related Art

Speech signal recognition techniques are classified into speech recognition and speaker recognition. The speech recognition is divided into a speaker-dependent system, in which the speech is recognized only for a specific speaker, and a speaker-independent system, in which the speech is recognized regardless of a speaker.

More specifically, the speech recognition system is composed of three steps including speech detection, feature extraction, and speech recognition/matching (pattern classification). In particular, as the last step, the speech recognition/matching is described in more detail below.

A feature vector obtained from the feature extraction is subjected to a similarity measurement and recognition process. In order to measure and recognize the similarity, three are employed an acoustic model in which a signal characteristic of the speech is molded and compared, and a language model in which a linguistic order relation of words and syllables included in the recognized speech. The acoustic model is divided into a direct comparison method in which the recognized object is set into a feature vector model and is compared to a feature vector of an input signal, and a statistical method in which a feature vector of the recognized object is statistically processed and used. In the direct comparison method, units such as words and phonemes as the recognized object are set into a feature vector model, and a similarity between an input speech and the feature vector modeled units is determined. A representative direct comparison method is a vector quantization method. In the vector quantization method, a previously obtained feature vectors or coefficients are mapped to a codebook as an existing model, and thus are encoded into representative values which, in turn, are compared with each other. In the statistical model method, units of the recognized object are configured into state sequences, and a relation between the state sequences is used. The state sequence may allow representing a complex model. Thus, except for simple word recognition, most of speech recognitions belong to the statistical model method based on the state sequence. The method in which the relation between the status states is used may include a method such as DTW (Dynamic Time Warping) in which a temporal arrangement relation, a statistical method such as HMM (Hidden Markov model) in which a probability value, an average, and a variance are used as objects to be compared, and a method using an artificial neural network.

However, the speech recognition technique according to the prior art is focused only on accurately recognizing contents that the user utters. Thus, in the prior art, there is relatively little research on artificial intelligence (AI) technology by which the user's actual intention is figured out.

Furthermore, the number of applications that may be applied to mobile phones and smart TVs are increasing exponentially. In this connection, in the prior art, there is no approach by which a speech recognition service optimized for each application is provided. The speech recognition service according to the prior art is only configured to be device-specific.

SUMMARY OF THE INVENTION

One embodiment (first embodiment) of the present invention is to precisely detect a user's intention, with taking into account a time and ambient environment at which the user utters any speech, and thus to provide different speech recognition services for the same speech based on the intention.

Furthermore, another embodiment (second embodiment) of the present invention is to provide a solution for extending an applicable speech recognition service using information about an application executed in a multimedia device.

It is to be understood that both the foregoing general description and the following detailed description of the present invention are exemplary and explanatory and are intended to provide further explanation of the invention as claimed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 14 categorizes types of metadata stored in a memory of a multimedia device according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following description, various embodiments according to the present invention are explained with reference to attached drawings.

Figure 1:
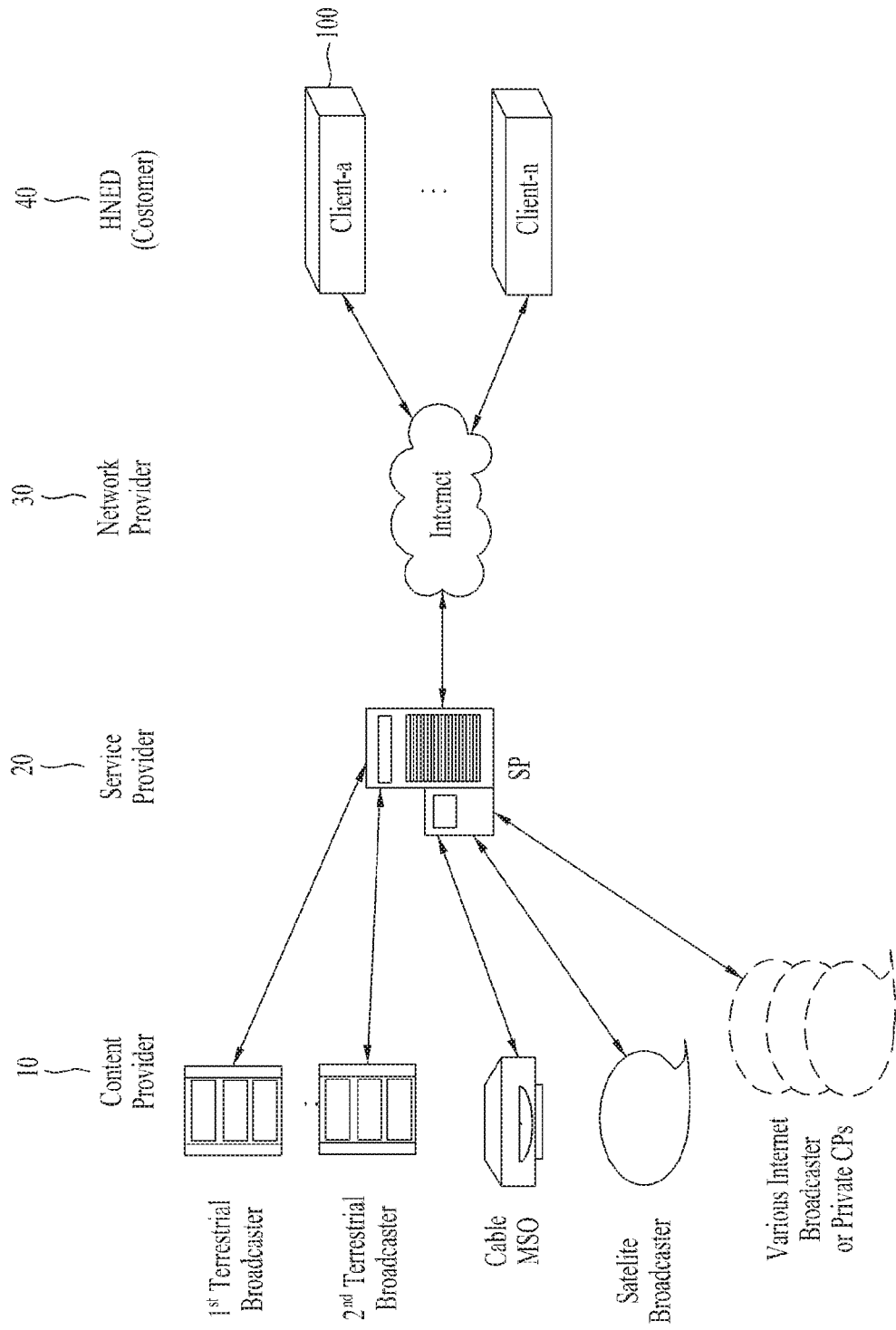
FIG. 1 is a schematic diagram illustrating a service system including a digital device according to one embodiment of the present invention.

FIG. 1 illustrates a broadcast system including a digital receiver according to an embodiment of the present invention.

Referring to FIG. 1, examples of a broadcast system comprising a digital receiver may include a content provider (CP) 10, a service provider (SP) 20, a network provider (NP) 30, and a home network end user (FINED) (Customer) 40. The HNED 40 includes a client 100, that is, a digital receiver.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Figure 2:
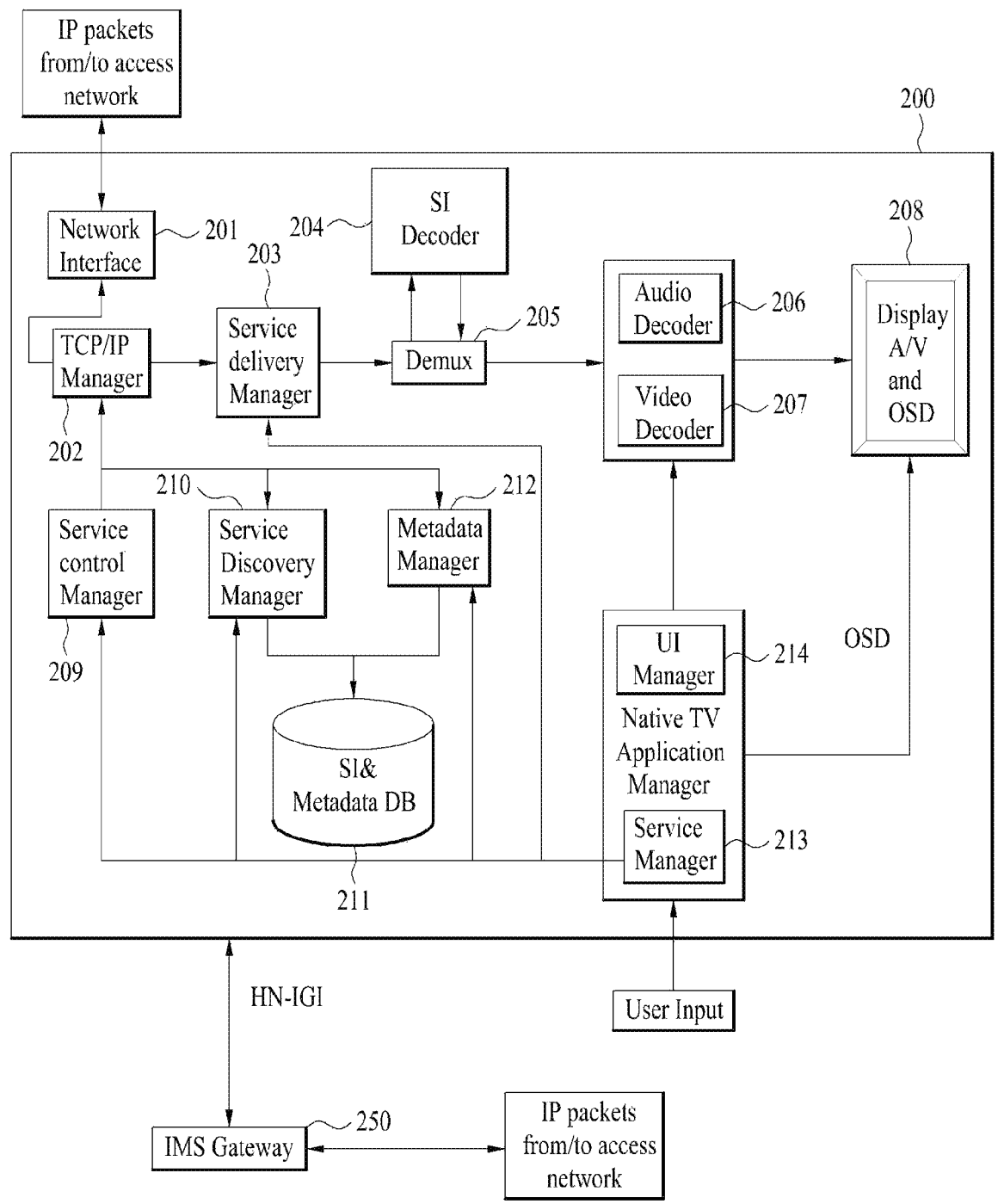
FIG. 2 is a block diagram showing a digital device according to one embodiment of the present invention.

FIG. 2 is a schematic diagram of a digital receiver 200 according to an embodiment of the present invention. The digital receiver 200 may correspond to the client 100 shown in FIG. 1.

The digital receiver 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network.

The TCP/IP manager 202 may involve delivery of IP packets transmitted to the digital receiver 200 and IP packets transmitted from the digital receiver 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 may demultiplex audio data, video data, SI from a received packet through packet identifier (PID) filtering and transmit the demultiplexed data to corresponding processors, that is, the audio/video decoder 206/207 and the SI decoder 204.

The SI decoder 204 may parse and/or decode SI data such as program specific information (PSI), program and system information protocol (PSIP), digital video broadcast-service information (DVB-SI), etc.

The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a user interface (UI) manager 214, administrate the overall state of the digital receiver 200, provides a UI, and manage other mangers.

The UI manager 214 can receive a key input from the user and provide a graphical user interface (GUI) related to a receiver operation corresponding to the key input through OSD.

The service manager 213 may control and manage service-related managers such as the service delivery manager 203, the service discovery manager 210, the service control manager 209, and the metadata manager 212.

The service manager 213 may conFIG. a channel map and enable channel control at the request of the user on the basis of the channel map.

The service manager 213 may receive service information corresponding to channel from the SI decoder 204 and set audio/video PID of a selected channel to the demultiplexer 205 so as to control the demultiplexing procedure of the demultiplexer 205.

The application manager can conFIG. an OSD image or control configuration of the OSD image to provide a window for SNS on a predetermined region of the screen when the user requests SNS. The application manager can conFIG. the OSD image or control the configuration of OSD image such that the SNS window can be determined and provided at the request of the user in consideration of other services, for example, a broadcast service. In other words, when the digital receiver 200 may provide a service (for example, SNS) through an image on the screen, the digital receiver 200 may conFIG. the image such that it can appropriately cope with requests in consideration of relationship with other services, priority, etc.

The application manager can receive data for SNS from a related external server such as an SNS providing server or a manufacturer-provided server and store the received data in a memory such that the data is used to conFIG. OSD for providing SNS at the request of the user and SNS may be provided through a predetermined area of the screen. Furthermore, the digital receiver 200 can store data, related with a service and input by the user during the service, in the memory in a similar manner such that the data is used to conFIG. the service and, if required, process the data into a form required for another digital receiver and transmit the processed data to the other digital receiver or a related service server.

In addition, the application manager, the controller or the digital receiver can control information or an action corresponding to a request of the user to be executed when the user makes the request while using the SNS. For example, when the user selects input data of another user or a region corresponding to the input data while using the SNS, the application manager, the controller or the digital receiver may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital receiver.

When the user moves the first result (e.g. image data) to a broadcast program or broadcast service output area through drag & drop, the digital receiver can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this case, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital receiver can automatically determine the type of the second process and whether or not to perform the second process on the basis of a position variation of the first result. In this case, coordinate information of the screen can be used for determining whether the position of the first result is changed or for information on a changed position between the second process and the first result. For example, when a service and/or OSD may be displayed on the screen, the digital receiver can determine and store coordinate information about the displayed service and/or OSD. Accordingly, the digital receiver can be aware of coordinate information about a service and data being provided to the screen in advance and thus can recognize a variation in the position (information) of the first result on the basis of the coordinate information and perform the second process based on the position of the first result.

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

An IMS (IP Multimedia Subsystem) gateway 250 may include functions required to access an IMS based IPTV services.

Figure 3:
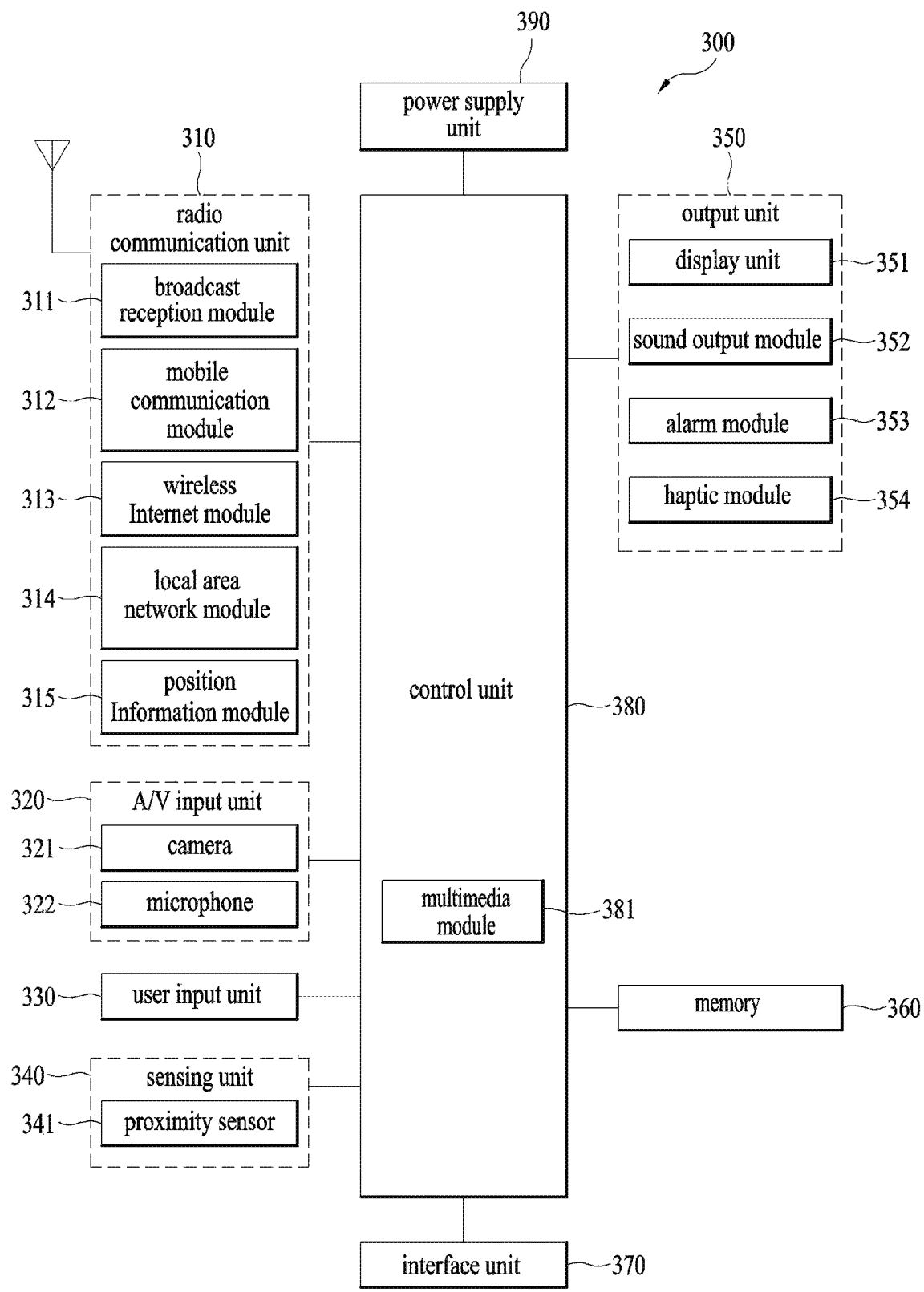
FIG. 3 is a block diagram showing the configuration of a digital device according to another embodiment of the present invention.

FIG. 3 is a block diagram of a mobile terminal 300 in accordance with an embodiment of the present invention. With reference to FIG. 3, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390. FIG. 3 shows the mobile terminal 300 having various components, but it is understood that implementing all of the illustrated components is not a requirement. More or fewer components may be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 may be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 is able to calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user may be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence.

The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
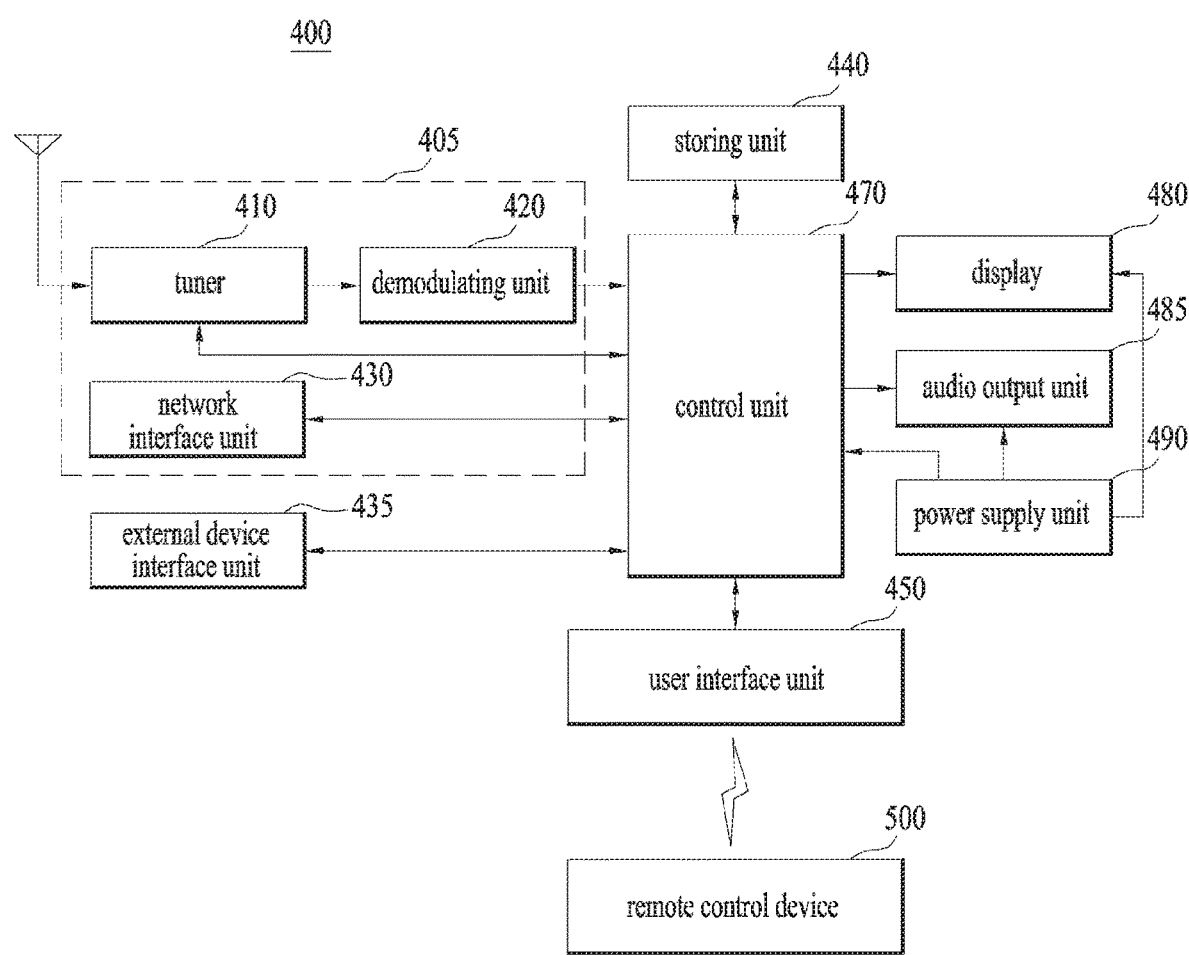
FIG. 4 is a diagram showing a digital device according to another embodiment of the present invention.

FIG. 4 illustrates a digital receiver according to another embodiment of the present invention.

Referring to FIG. 4, an exemplary digital receiver 400 according to the present invention may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels.

The demodulator 420 may receive a digital IF (Intermediate Frequency) signal (DIF) converted by the tuner 410 and demodulate the DIF signal.

A stream signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital receiver 400. To implement this, the external device interface 435 may include an A/V input/output unit (not shown) or an RF communication unit (not shown).

The external device interface 435 can be connected with external devices such as a digital versatile disk (DVD), a Blu-ray player, a game device, a camera, a camcorder, a computer (Weather computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 may provide an interface for connecting the digital receiver 400 to wired/wireless networks.

Using the network interface 430, the digital receiver can transmit/receive data to/from other users or other electronic apparatuses or access a predetermined web page through a network connected thereto or another network linked to the connected network.

The network interface 430 can selectively receive a desired application from among publicly open applications through a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430. The storage unit 440 may store various platforms which will be described later. The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital receiver 400, received broadcast content, or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital receiver 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals. The display unit 480 may be a PDP, an LCD, an OLED, a flexible display, a 3D display or the like. The display unit 480 may be configured as a touch-screen and used as an input device rather than an output device. The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450. The digital receiver 400 may further include the photographing unit (not shown) for photographing the user. Image information acquired by the photographing unit (not shown) can be supplied to the controller 470. The controller 470 may sense a gesture of the user from an image captured by the photographing unit (not shown) or a signal sensed by the sensing unit (not shown), or by combining the image and the signal.

The power supply unit 490 may supply power to the digital receiver 400. Particularly, the power supply unit 490 can supply power to the controller 470 which can be implemented as a system-on-chip (SoC), the display unit 480 for displaying images, and the audio output unit 485 for audio output.

The remote controller 500 may transmit user input to the user input interface 450. To achieve this, the remote controller 500 can use Bluetooth, RF communication, IR communication, UWB, ZigBee, etc. In addition, the remote controller 500 can receive audio, video or data signal output from the user input interface 350 and display the received signal or output the same as audio or vibration.

The functions of the application manager shown in FIG. 2 can be divided and executed by the controller 470, the storage unit 440, the user interface 450, the display unit 480 and the audio output unit 485 which are controlled by the controller 470.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 may be omitted or a component (not shown in FIG. 2) may be added as required. The digital receiver according to the present invention may not include the tuner and the demodulator, differently from the digital receivers shown in FIGS. 2 and 4, and may receive content through the network interface or the external device interface and reproduce the content.

The digital receiver is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

Figure 5:
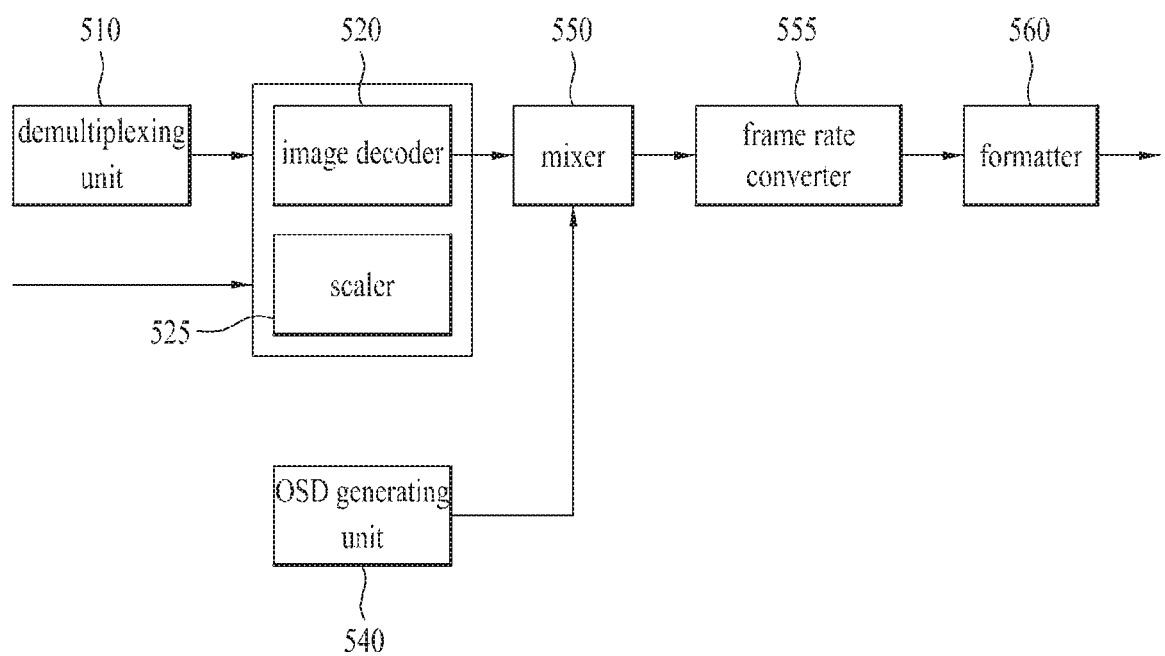
FIG. 5 is a block diagram showing the detailed configuration of each of controllers of FIGS. 2 to 4 according to one embodiment of the present invention.

FIG. 5 illustrates a digital receiver according to another embodiment of the present invention. Particularly, FIG. 5 shows a configuration for implementing a 3D digital receiver, which can be included in the configurations of FIGS. 2 and 3.

The digital receiver according to the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor can process a demultiplexed image signal using a video decoder 525 and a scaler 535. The video decoder 525 can decode the demultiplexed image signal and the scaler 535 can scale the resolution of the decoded image signal such that the image signal can be displayed.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a user interface image of the digital receiver, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals. Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

Figure 6:
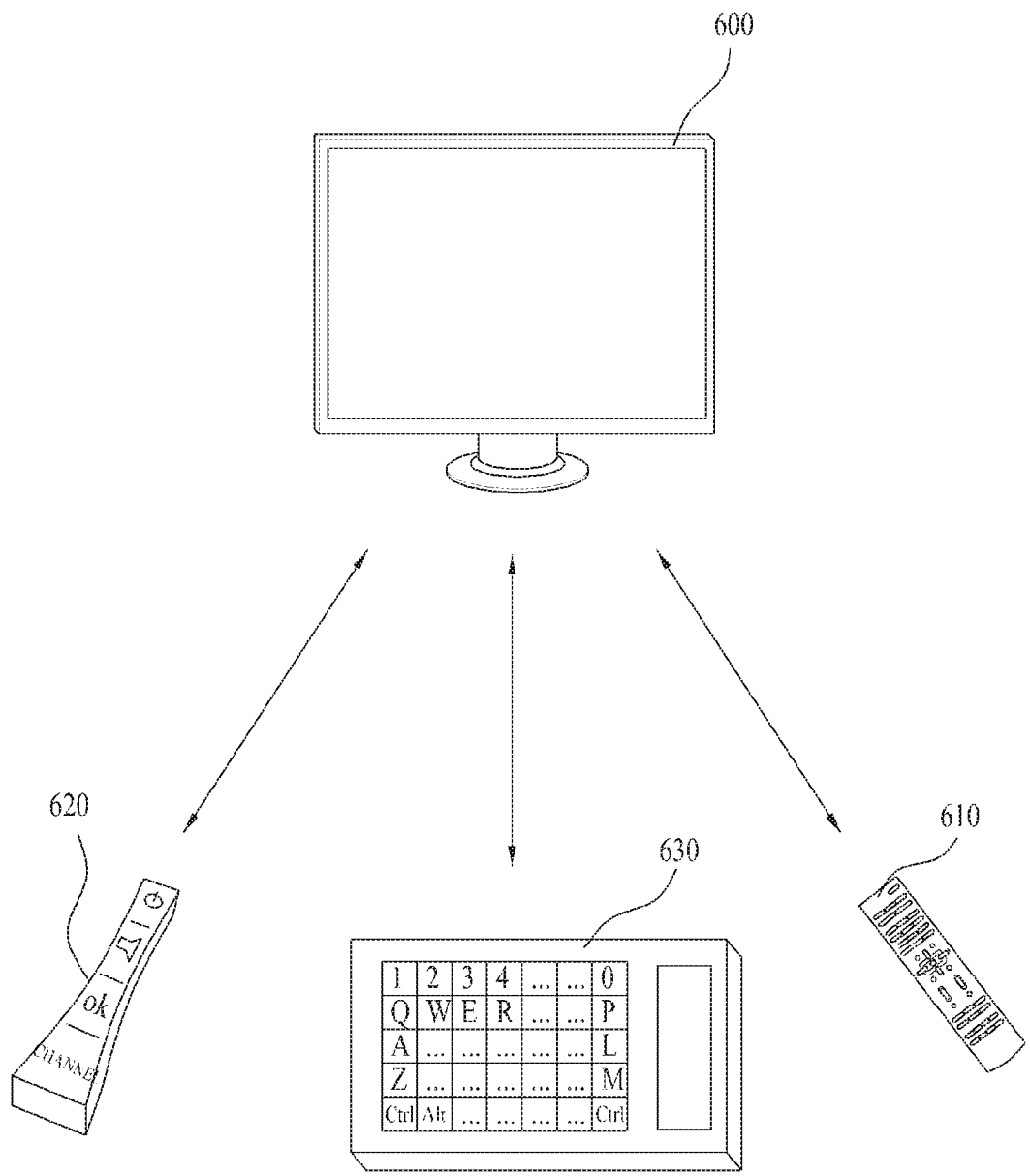
FIG. 6 is a diagram showing an input unit connected to each of the digital devices of FIGS. 2 to 4 according to one embodiment of the present invention.

FIG. 6 illustrates remote controllers of a digital receiver according to an embodiment of the present invention.

To execute various operations for implementing the present invention according to embodiments, various user interface devices (UIDs) which can communicate with a digital receiver 600 in a wired/wireless manner can be used as remote controllers.

The remote controllers can use various communication protocols such as Bluetooth, RFID, IrDA, UWB, ZigBee, DLNA, etc.

UIDs can include a mobile device (e.g., a smart phone, a tablet PC, and the like), a magic remote controller 620 and a remote controller 630 equipped with a keyboard and a touch pad in addition to a general remote controller 610.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

The digital device described in the present specification can be operated by based on WebOS platform. Hereinafter, a WebOS based process or algorithm may be performed by the controller of the above-described digital device. The controller includes the controllers of FIGS. 2 to 5 and has wide concepts. Accordingly, hereinafter, a component for processing WebOS based services, applications, content, etc., including software, firmware or hardware in a digital device is referred to a controller.

Such a WebOS based platform may improve development independency and functional extensibility by integrating services, applications, etc. based on a Luna-service bus, for example, and increase application development productivity based on web application framework. In addition, system resources, etc. may be efficiently used via a WebOS process and resource management to support multitasking.

A WebOS platform described in the present specification may be available or loaded not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Television Based on WebOS

Figure 7:
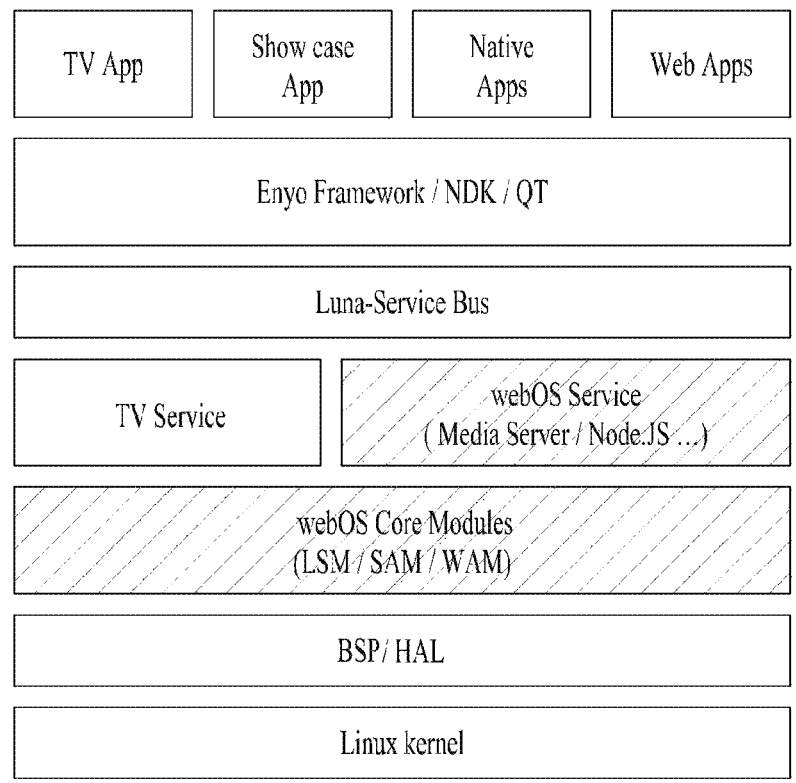
FIG. 7 is a diagram illustrating WebOS architecture according to one embodiment of the present invention.

FIG. 7 is a diagram illustrating WebOS architecture according to one embodiment of the present invention.

The architecture of a WebOS platform will now be described with reference to FIG. 7.

The platform may be largely divided into a kernel, a webOS core platform based on a system library, an application, a service, etc.

The architecture of the WebOS platform has a layered structure. OS is provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a WebOS core modules layer, a service layer, a Luna-service bus layer and an Enyo framework/native developer's kit (NDK)/QT layer are sequentially provided. At the highest layer, an application layer is provided.

One or more layers of the above-described WebOS layered structure may be omitted and a plurality of layers may be combined to one layer and one layer may be divided into a plurality of layers.

The WebOS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications.

The WAM is based on Enyo framework, because a WebOS regards a web application as a basic application.

An application may use a service via a Luna-service bus. A service may be newly registered via a bus and the application may detect and use a desired service.

The service layer may include services having various service levels, such as a TV service, a WebOS service, etc. The WebOS service may include a media server, Node.JS, etc. and, in particular, the Node.JS service supports JavaScript, for example.

The WebOS service may be communicated to a Linux process implementing function logic via a bus. This WebOS service is largely divided into four parts, migrates from a TV process and an existing TV to a WebOS, is developed as services which differ between manufacturers, WebOS common services and Javascripts, and is composed of the Node.JS service used via Node.JS.

The application layer may include all applications supportable by a digital device, such as a TV application, a showcase application, a native application, a web application, etc.

Applications on the WebOS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a native application based on Qt and includes basic applications provided along with the WebOS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
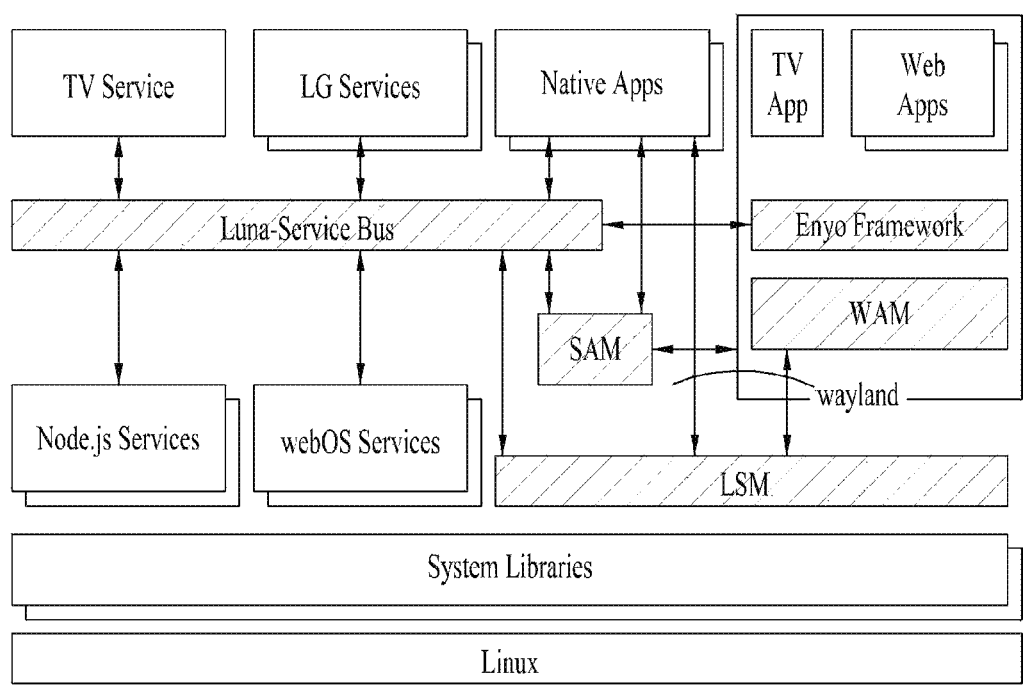
FIG. 8 is a diagram illustrating architecture of a WebOS device according to one embodiment of the present invention.

FIG. 8 is a diagram illustrating the architecture of a WebOS device according to one embodiment of the present invention.

FIG. 8 is a block diagram based on a runtime of a WebOS device and is described with reference to the layered structure of FIG. 7.

Hereinafter, a description will be given with reference to FIGS. 7 and 8.

Referring to FIG. 8, services, applications and WebOS core modules are included on a system OS (Linux) and system libraries and communication therebetween may be performed via a Luna-service bus.

Node.JS services based on HTML5 such as e-mail, contact or calendar, CSS, Javascript, etc., WebOS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, Now on, notification, search, auto content recognition (ACR), contents list browser (CBOX), wfdd, digital media remastering (DMR), remote application, download, Sony Philips digital interface format (SDPIF), etc., native applications such as PDK applications, browsers, QML applications, a UI-related TV applications based on Enyo framework and web applications are processed via WebOS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, data management system (DMS), DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window.

The LSM supports implementation of a system UI based on a QML and improves development productivity. QML UX may easily conFIG. a view using a screen layout and UI components based on model view controller (MVC) and easily develop code for processing user input. An interface between the QML and the WebOS component is achieved via a QML extensibility plug-in and graphic operation of an application may be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, ACR, etc.

Figure 9:
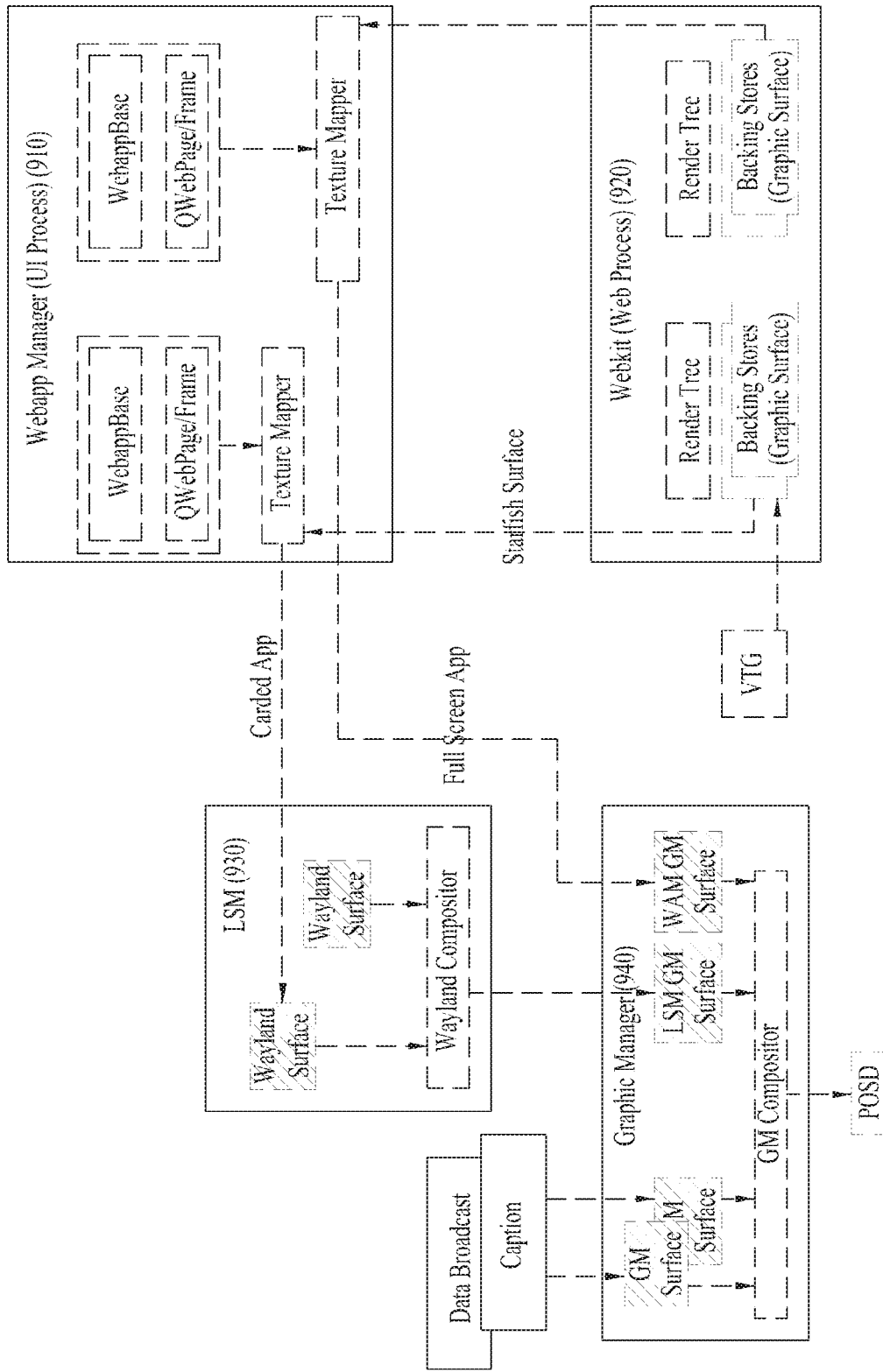
FIG. 9 is a diagram illustrating a graphic composition flow in a WebOS device according to one embodiment of the present invention.

FIG. 9 is a diagram illustrating a graphic composition flow in a WebOS device according to one embodiment of the present invention.

Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a fullscreen application. The web application manager 910 receives an application generated by the WebKit 920 in order to share a graphic processing unit (GPU) memory for graphic management between the UI process and the web process and delivers the application to the LSM 930 if the application is not a fullscreen application. If the application is a fullscreen application, the LSM 930 may bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The fullscreen application is directly delivered to the graphics manager 940 without passing through the LSM 930 as described above and is processed in the graphics manager compositor via the WAM GM surface.

The graphics manager processes and outputs all graphics data in the webOS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
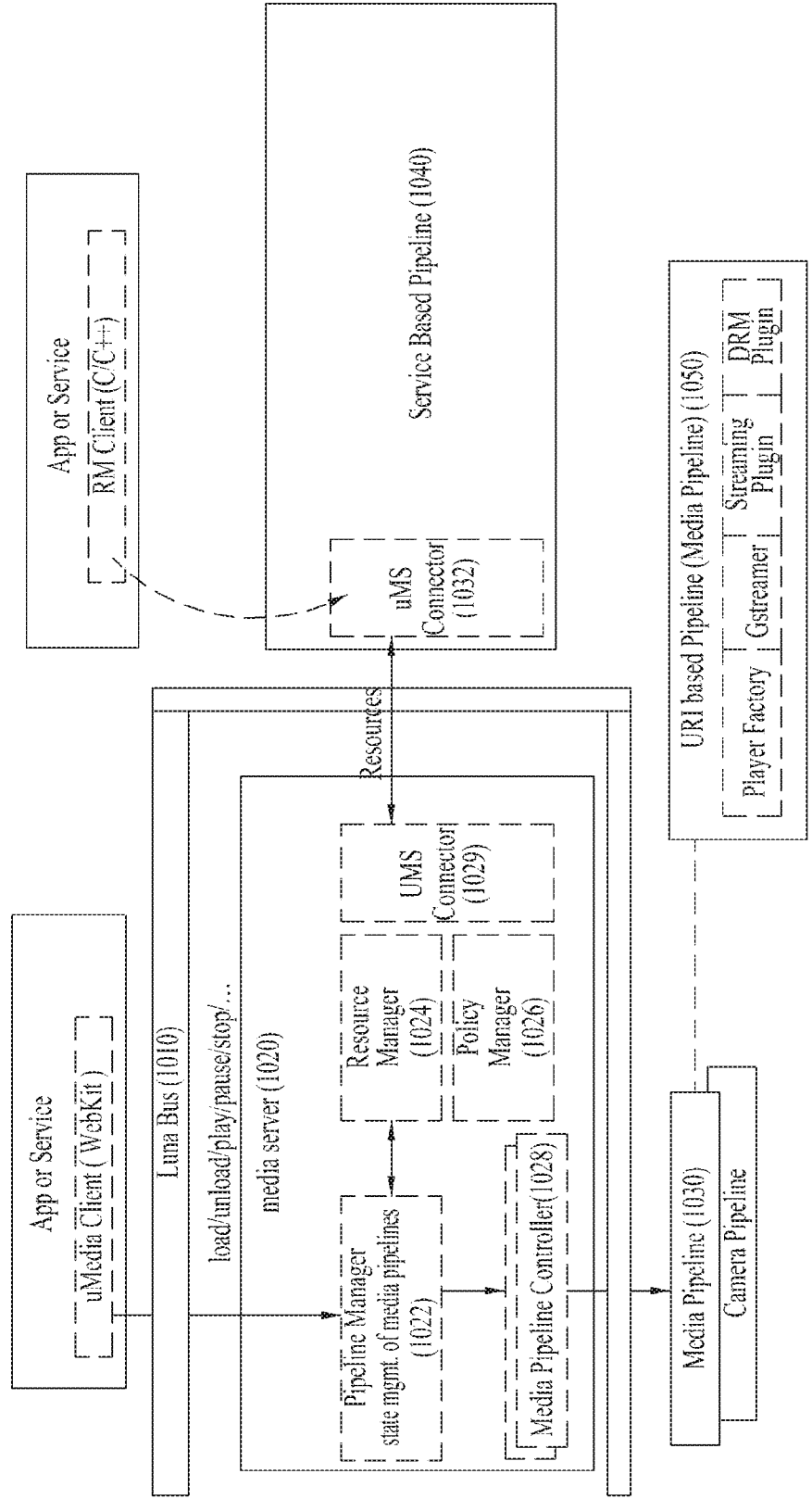
FIG. 10 is a diagram illustrating a media server according to one embodiment of the present invention.
Figure 11:
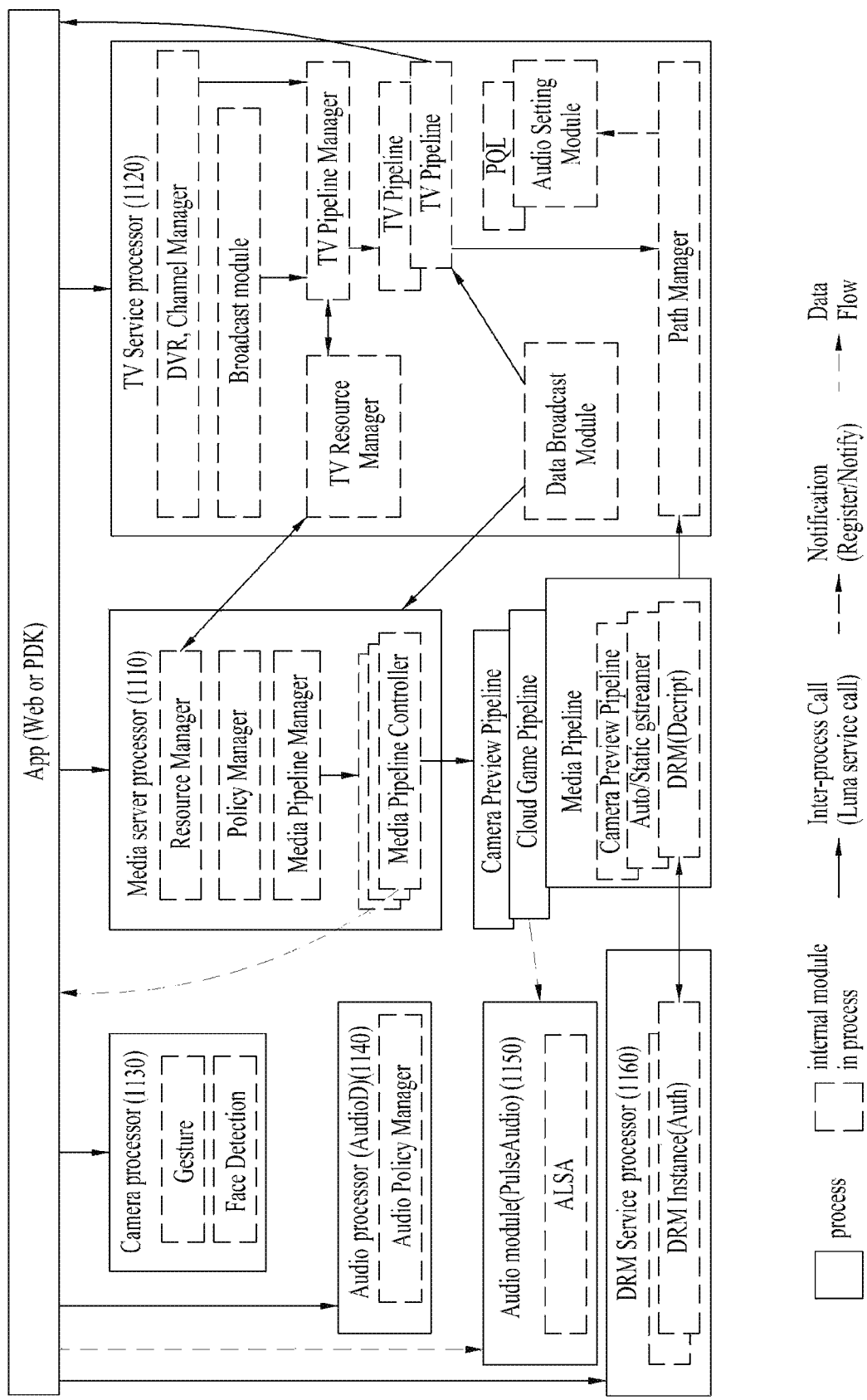
FIG. 11 is a block diagram showing the configuration of a media server according to one embodiment of the present invention.
Figure 12:
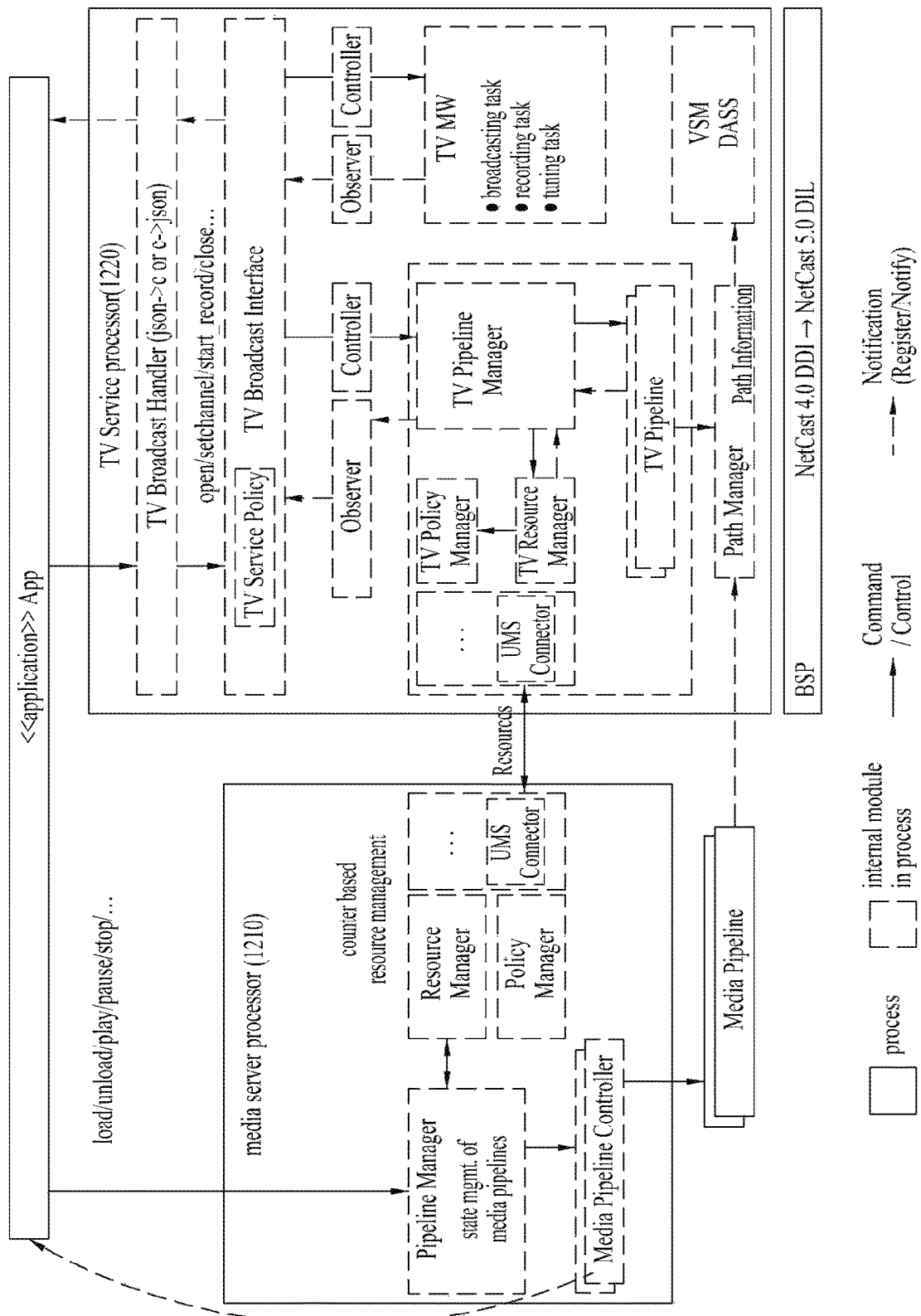
FIG. 12 is a diagram illustrating a relationship between a media server and a TV service according to one embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneously displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (Skype) pipeline, a third-party pipeline, etc.

The media server may process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back a HTML5 standard media.

The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server may manage pipeline controller resources.

The media server supports extensibility, reliability, efficient resource usage, etc., for example.

In other words, the uMS, that is, the micro media server, manages and controls resource usage for appropriate processing within the WebOS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and may exchange data with the media server 1020 or the pipeline via the clients.

The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smartshare playback, thumbnail extraction, NDK, cinema, multimedia and hypermedia information coding experts group (MHEG), etc.

The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this case, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

A method of using a service in PDK may be used.

Alternatively, a method of using in existing CP may be used. For backward compatibility, plug-in of an existing platform may be extended and used based on Luna.

Lastly, an interface method using a non-WebOS may be used. In this case, a Luna bus may be directly called to perform interfacing.

Seamless change is processed by a separate module (e.g., TVwin) and refers to a process of first displaying a TV program on a screen without a WebOS before or duration WebOS booting and then performing seamless processing. This is used for the purpose of first providing a basic function of a TV service, for fast response to a power-on request of a user, because a booting time of a WebOS is late. The module is a part of a TV service process and supports seamless change for providing fast booting and a basic TV function, factory mode, etc. The module is responsible for switching from the non-WebOS mode to the WebOS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1150. The application or a pipeline related thereto may notify the audio module 1150 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1160 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example.

In the present specification, the TV service processor may have the configuration of FIG. 11 or FIG. 12 or a combination thereof. Some components may be omitted or other components (not shown) may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface may transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The BSP supports backward compatibility with an existing digital device.

The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted. In the present specification, the resource manager in the media server processor 1110/1210 may perform resource management to a counter base, for example.

First Embodiment (Analysis of Intention of User Speech)

As used herein, embodiments are divided, for convenience, into a first embodiment (FIGS. 13 to 23) and a second embodiment (FIGS. 24 to 27). However, the present invention is not limited thereto. For example, configurations are also within a scope of the present invention that the first embodiment and/or the second embodiment are combined with the previous FIGS. 1 to 12.

Figure 13:
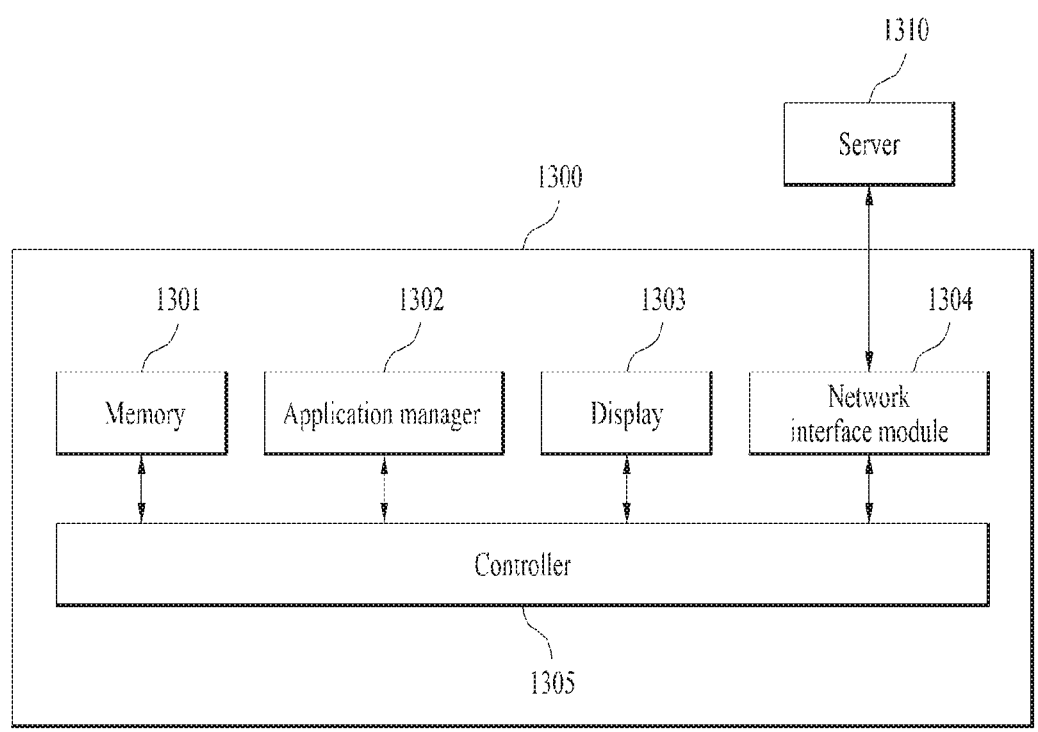
FIG. 13 shows main internal components of a multimedia device capable of processing a speech-based command according to one embodiment of the present invention.

FIG. 13 shows main internal components of a multimedia device capable of processing a speech-based command according to one embodiment of the present invention.

As shown in FIG. 13, a multimedia device 1300 according to one embodiment of the present invention includes a memory 1301, an application manager 1302, a display 1303, a network interface module 1304, a controller 1305, and the like. In one example, in FIG. 13, a module for processing the speech-based command is not shown separately. Such a module may be built in the above-described controller 1305 or may be added as a separate module. In addition, the user's speech may be received directly via a microphone (not shown) of the multimedia device 1300 shown in FIG. 13. Alternatively, receiving the speech from a remote controller for controlling the multimedia device 1300 also falls within the scope of the present invention.

The memory 1301 shown in FIG. 13 stores at least one application therein. The application manager 1302 shown in FIG. 13 executes an arbitrary application among at least one application stored in the memory 1301.

The controller 1305 shown in FIG. 13 receives arbitrary speech-based data from the outside. As described above, the speech may be received directly via the microphone of the multimedia device 1300, or may be received via the remote controller.

Further, the controller 1305 shown in FIG. 13 captures video data of a currently-executed application in response to the received speech-based data. Then, the controller controls the network interface module 1304 to transmit to a server 1310 the captured video data, the received speech-based data, and additional information about the currently-executed application.

In addition, the controller 1305 shown in FIG. 13 controls the network interface module 1304 to receive a feedback result value associated with the speech-based data from the server 1310. The feedback result value even for the same speech-based data may be changed, for example, based on the captured video data, and the additional information about the currently-executed application. This will be described in more detail below in FIG. 22 and FIG. 23.

The arbitrary application may correspond to an application stored in the memory 1301. Alternatively, the application may include a general broadcast received via a tuner (not shown) or the network interface module 1304 shown in FIG. 13.

Further, the controller 1305 shown in FIG. 13 controls the network interface module 1304 to transmit the received speech-based data and an ID (identification) of the currently-executed application to the first server. Then, the controller 1305 shown in FIG. 13 controls the network interface module 1304 to receive intent information of the speech-based data from the first server. The first server corresponds to, for example, a natural language processing (NLP) cloud server 2320 shown in FIG. 23. As used herein, NLP refers to software or hardware that processes natural language-related data.

As used herein, the intent information may be extracted via analysis by the server, via analysis by the multimedia device, or via communication between the server and multimedia device. The intent information may vary based on not only the speech content of the user but also use environment, and the like.

Further, only when it is determined based on the intent information that capturing of the video data of the currently-executed application is required, the controller 1305 shown in FIG. 13 controls the network interface module 1304 to transmit the captured video data and genre information and casting information about the currently-executed application to a second server. Next, the controller 1305 shown in FIG. 13 controls the network interface module 1304 to receive position information about the specific object as recognized from the speech-based data from the second server. The second server corresponds to, for example, an image recognition cloud server 2330 shown in FIG. 23.

Further, the controller 1305 shown in FIG. 13 controls the network interface module 1304 to transmit a portion of the captured video data to a third server based on the received location information. The controller 1305 shown in FIG. 13 controls the network interface module 1304 to receive a feedback result value associated with the speech-based data from the third server. The third server corresponds to, for example, an image recognition cloud server 2340 shown in FIG. 23. In one example, in FIG. 23, the NLP cloud server 2320, the image recognition cloud server 2330, and the image recognition cloud server 2340 are shown as separate entities. The present invention is not limited to this configuration. For example, the NLP cloud server 2320, the image recognition cloud server 2330, and the image recognition cloud server 2340 may be combined into one or two servers.

The feedback result value even for the same speech-based data may vary depending on the EPG information (for example, genre information, casting information, etc.). This will be described in more detail below in FIG. 19.

FIG. 14 categorizes types of meta-data stored in the memory of the multimedia device, according to one embodiment of the present invention. The memory is shown in FIG. 13.

The intention associated with the same user speech should be determined to vary based on a state of the multimedia device in use and the like. That is, the present the speech recognition service utilizes all the information that the multimedia device (e.g., a TV) may provide to allow more accurate recognition of the user's intention. FIG. 14 categorizes relevant information needed to improve the analysis of the intention by the speech recognition service. This categorization may allow the controller to selectively performing user intention analysis.

Type 1 corresponds to information about a broadcast program being viewed by the user. Type 2 corresponds to cumulative information of user's past viewings (history).

Type 3 corresponds to additional information about a currently-running application on the multimedia device. Type 4 corresponds to status information about TV (for example, installation area, language as set therein, type of application stored in memory, etc.). Finally, Type 5 Type 5 corresponds to a user's previous speech-based command. However, in order to more accurately detect the user intention, only the previously recognized speech to a currently recognized speech by a preset threshold time is regarded as the user's previous speech-based command. The previously recognized speech may be combined with the currently recognized speech such that the user intention is determined based on the combination. Therefore, this may reduce a possibility of misinterpreting the user intention. This will be described in more detail below in FIG. 16.

First, an embodiment using the type of the application stored in the memory among the TV status information of the type 4 will be described with reference to FIG. 15.

Figure 15:
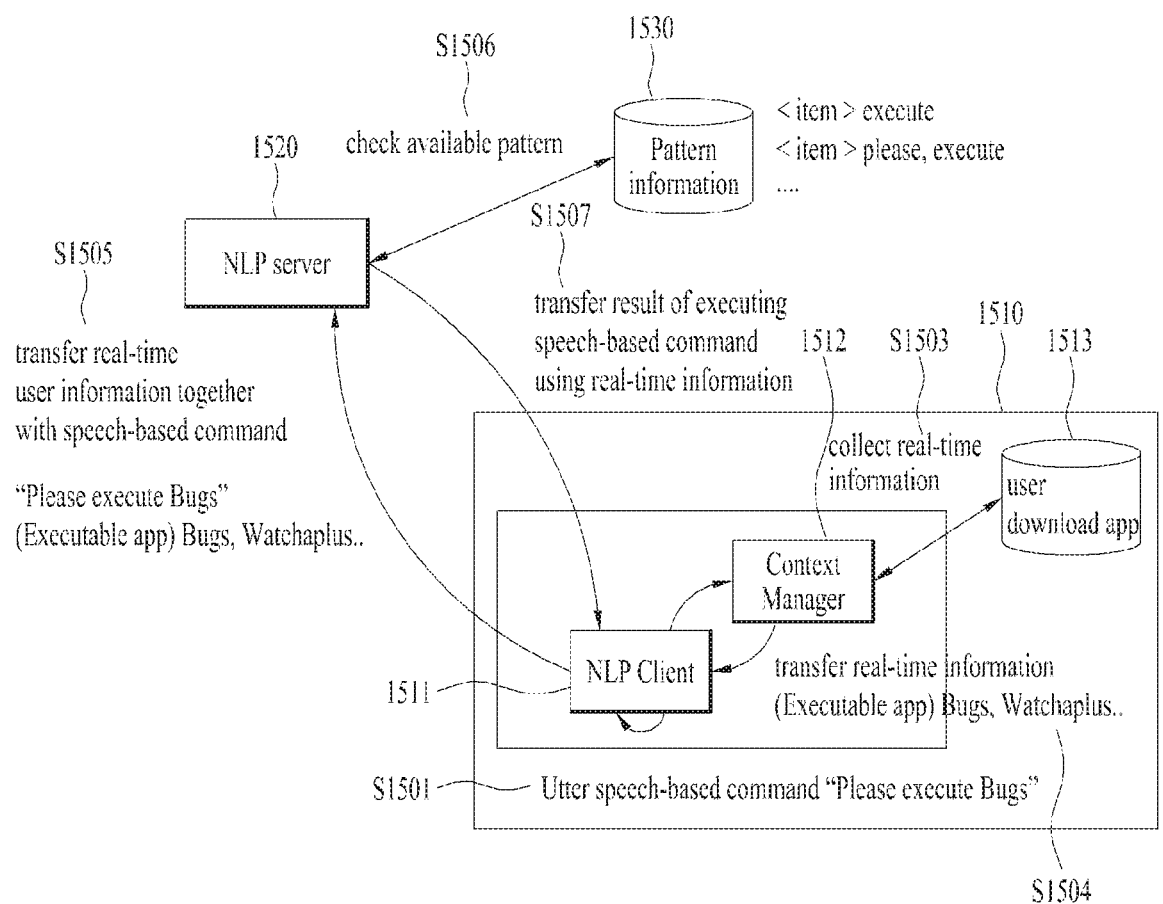
FIG. 15 shows a process in which a multimedia device extracts intention of a user's speech more accurately using information about an application, according to one embodiment of the present invention

FIG. 15 shows a process by which a multimedia device extracts the intent of a user's speech more precisely, using information about the application, according to one embodiment of the present invention.

First, as shown in FIG. 15, it is assumed that the multimedia device 1510 receives a speech "please, execute Bugs" as any speech-based command S1501. The Bugs is a music player application.

In this connection, the NLP (Natural Language Processing) client 1511 in the multimedia device 1510 requests real-time information to a context manager 1512. The context manager 1512 collects the real-time information from the memory 1513. Subsequently, the context manager 1512 transmits the real-time information to the NLP client 1511 back (S1504). However, the real-time information refers to information about an executable application. For example, the real-time information corresponds to an application list stored in the memory 1513.

In the speech recognition service according to the conventional scheme, only the received speech-based command itself is transmitted to the NLP server 1520. However, according to one embodiment of the present invention, the real-time information is transmitted to the NLP server 1520 together with the received speech-based command S1505.

In the speech recognition service according to the conventional scheme, the user speech "Bugs" is recognized as a "box". Since the information about the application stored in the memory is not used in the conventional scheme, the conventional service has a problem that the box cannot be corrected to the bugs. However, according to the present invention, even when the present speech recognition service recognizes the "Bugs" as the "box", the present recognition service may correct the "box" to the "Bugs" since the service knows that the application called the "Bugs" similar to the "box" in terms of the sound is stored in the memory.

The NLP server 1520 checks an applicable pattern using pattern information stored in the memory 1530 located in or outside the server. The server transmits a speech-based command result processed based on the real-time information to the NLP client 1511 S1507) For example, the server refers to the memory 1530 and then extracts and transmits the same operation command "execute" for all of the recognized command speeches "please, execute", "execute", "would you mind executing", etc.

Figure 16:
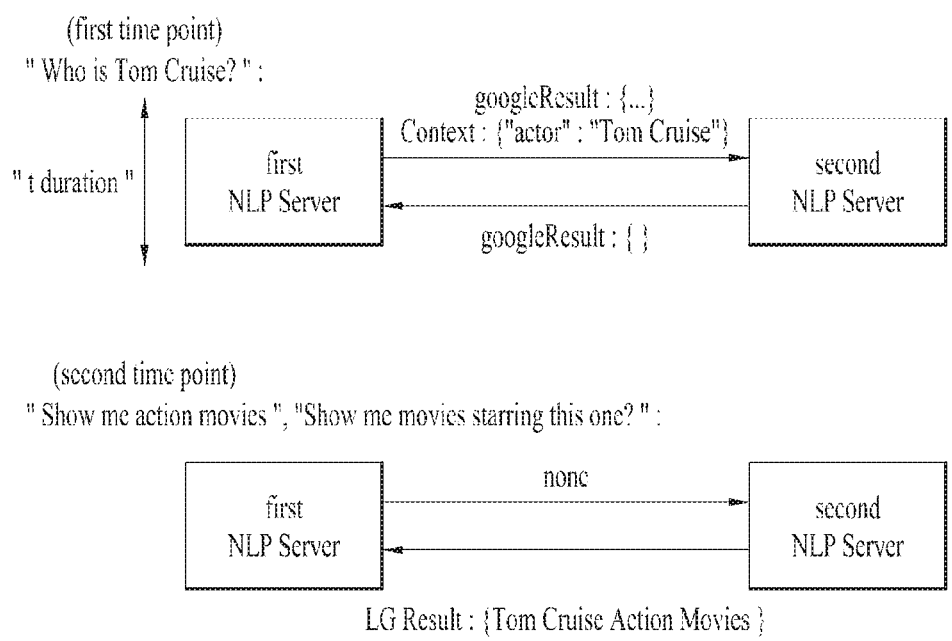
FIG. 16 shows a process in which a multimedia device extracts intention of a user's speech more precisely using a previously recognized speech to a currently recognized speech by a preset timing, according to one embodiment of the present invention.

FIG. 16 shows a process in which a multimedia device extracts intention of a user's speech more precisely using a previously recognized speech to a currently recognized speech by a preset timing, according to one embodiment of the present invention. The embodiment shown in FIG. 16 is related to the type 5 as described in the previous FIG. 14.

According to the conventional scheme, when the user utters a first speech "Who is Tom Cruise", information about Tom Cruise is provided. Then, when the same user utters a second speech "Show me action movies", only information on action movies which are not related to Tom Cruise is provided without consideration of the previously recognized first speech.

In contrast, according to the present invention, as shown in FIG. 16, when the user utters "Who is Tom Cruise" at a first time point, the first NLP server communicates with the second NLP server to provide relevant information associated with the utterance. In one example, in FIG. 16, the two servers are shown separately. The present invention is not limited to this configuration. A configuration in which one server capable of processing the speech recognition implements the above function is also within the scope of the present invention.

Further, when a speech-based command "Show me action movies" is recognized at a second time point which is within a preset "t" duration from the first time point, the speech recognized at the first time point and the speech recognized at the second time point are combined with each other, and, then, a result based on this combination is provided. Further, according to another embodiment of the present invention, not only when the condition that a current time should be within the "t" duration from the first time point is satisfied, but also when the speakers recognized at the above two time points are identical with each other, the speech recognized at the first time point may be combined with the speech recognized at the second time point, and then a result based on the combination may be provided.

Furthermore, a configuration in which the aforementioned predetermined duration t value is adjusted to be smaller or larger based on a behavior pattern of the user belongs to the right scope of the present invention.

Figure 17:
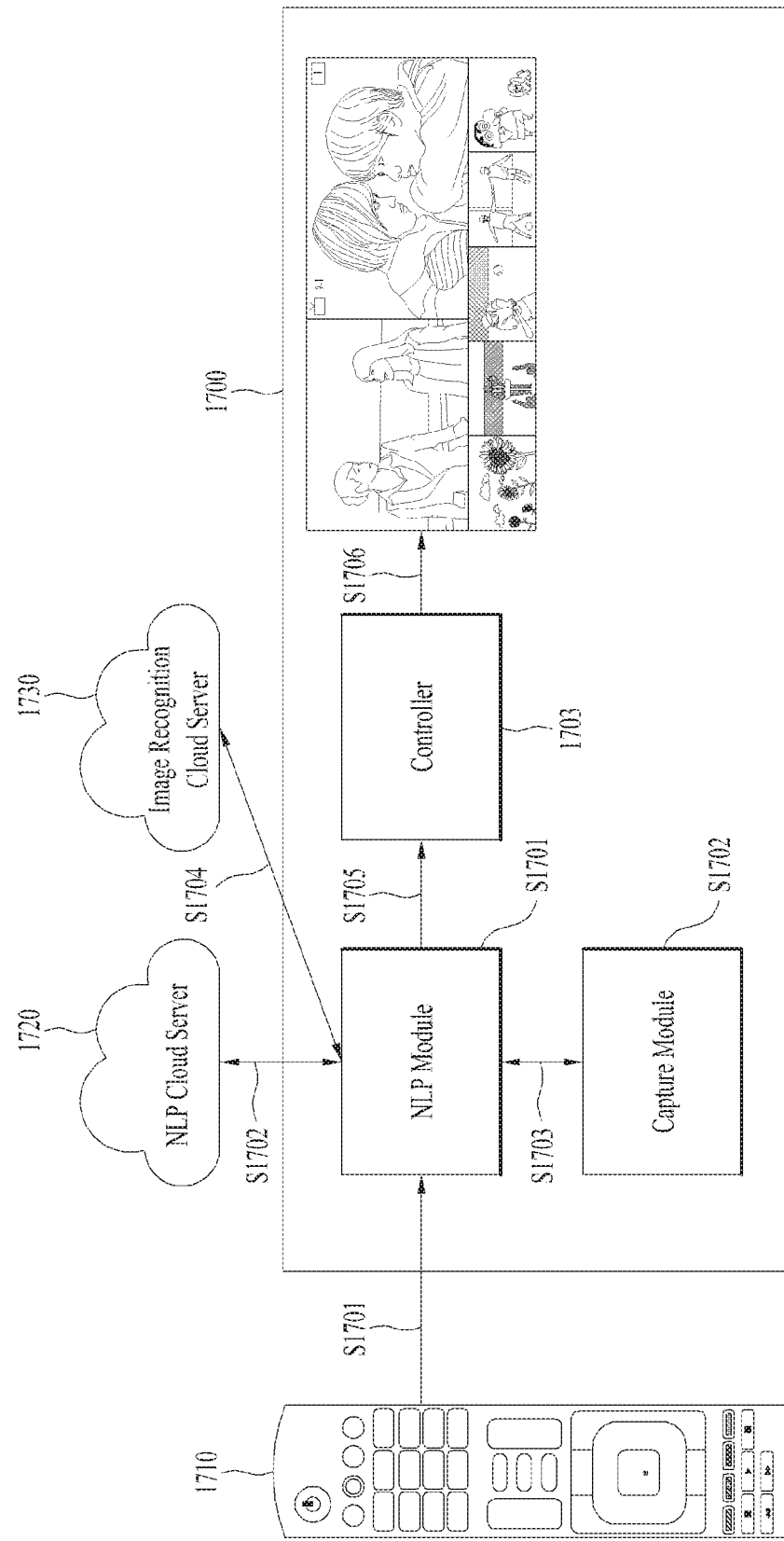
FIG. 17 shows a process in which a multimedia device uses broadcast information to more accurately extract a specific person and intention of a user's speech, according to one embodiment of the present invention.

FIG. 17 shows a process in which a multimedia device extracts a specific person and intention of a user's speech more accurately using information about a broadcast according to one embodiment of the present invention. According to the present invention, a scheme may use a voice to recognize a person appearing on video data as currently displayed and provide information on the person. Further, a scheme for increasing an accuracy of the person recognition via a capturing service is provided.

The multimedia device 1700 according to one embodiment of the present invention includes an NLP module 1701, a capture module 1702, a controller 1703, and a display. When an arbitrary speech-based command is received from a remote controller 1710 to the NLP module 1701, the NLP module 1701 analyzes the received speech-based command via communication with an NLP cloud server 1720. The capture module 1702 performs capturing of video data currently being output on the display. The NLP module receives a analysis result of the captured image via communication with an image recognition cloud server 1730. The NLP module transmits the received speech-based command and the analysis result of the image to the controller 1703 S1705. The controller 1703 combines the received information to improve the accuracy of the speech recognition, in particular, to determine the intention of the user speech, and finally transmits the speech recognition result based on the intent to the display (S1706).

Figure 18:
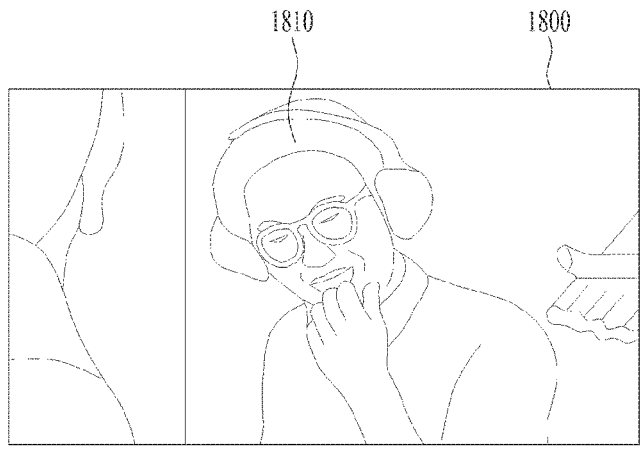
FIG. 18 shows a situation where a multimedia device displays a specific person according to one embodiment of the present invention.

FIG. 18 shows a situation in which a multimedia device displays a specific person according to one embodiment of the present invention. According to one embodiment of the present invention, it may be assumed that the multimedia device 1800 outputs an arbitrary specific person 1810, and the user utters a speech-based command associated with the specific person, for example, "Who is this person".

Figure 19:
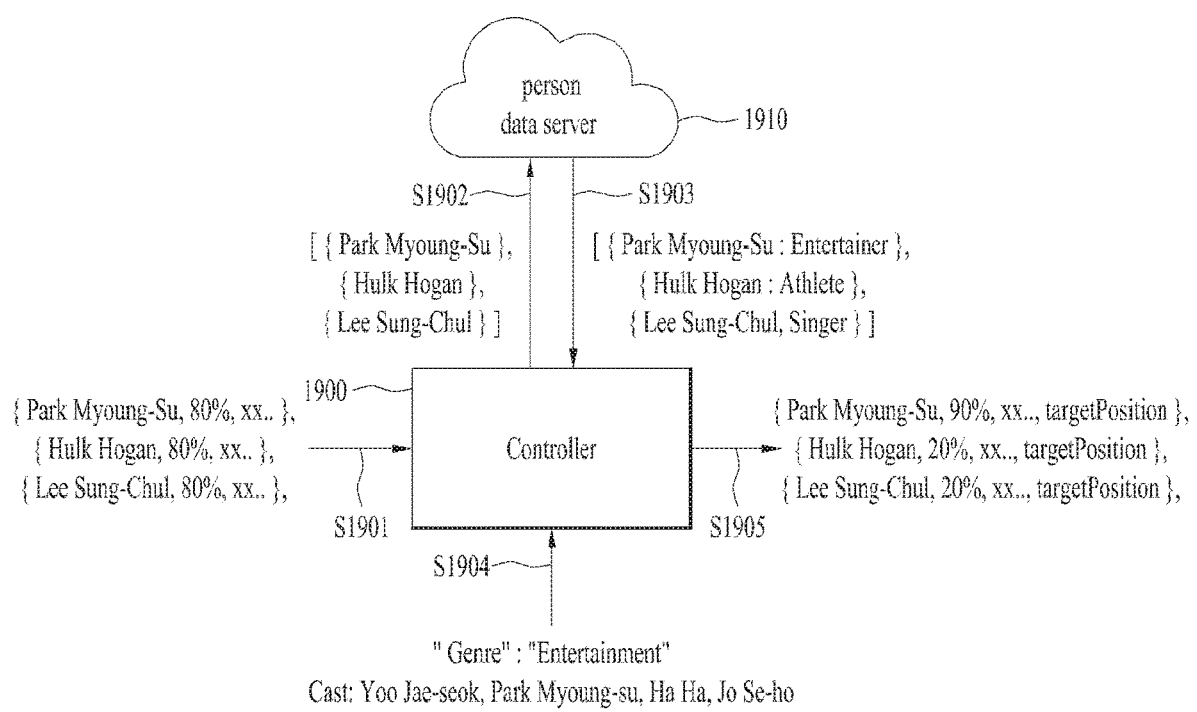
FIG. 19 shows a process of FIG. 17 in more detail.

FIG. 19 shows a process of FIG. 17 in more detail.

It is assumed that the controller 1900 shown in FIG. 19 is embedded in the multimedia device. In one example, the present invention may be configured so that the above function is executed in an external server. This makes it possible to simplify the hardware/software configuration of the multimedia device.

First, candidates of persons shown in FIG. 18 are determined to be three (for example, Park Myung-Su, Hulk Hogan, Lee Sung-Chul) based on data stored in the memory or via an arbitrary server. It may be assumed that the determination accuracies for all of the three persons are the same to be 80%. In a conventional approach, there was a problem that it was not possible to determine which one of these persons was a person currently displayed on the display.

In this connection, according to the present invention, the controller sends information about the three candidates to a person data server 1910. The controller receives job information about each person from the person data server S1903.

Then, the controller receives EPG information (for example, genre information, casting information, etc.) from a broadcasting station S1904. The controller adjusts a recognition accuracy of the recognized person at a corresponding position based on the data received in the operations of S1903 and S1904 at an operation of S1905.

Figure 20:
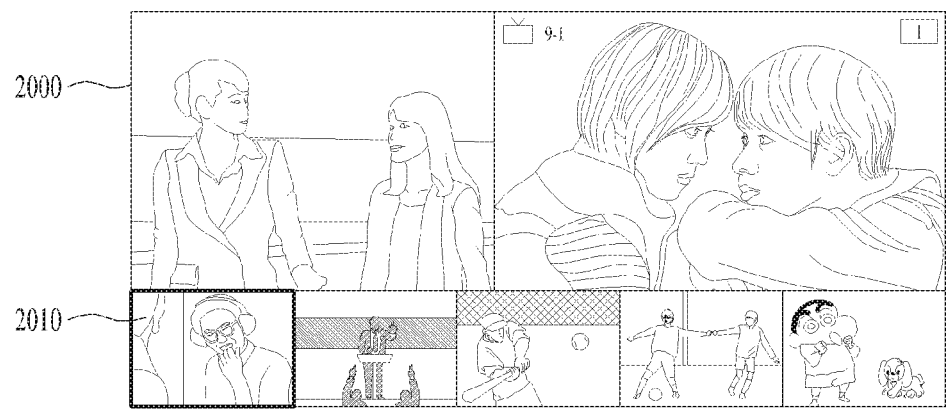
FIG. 20 shows a result of a speech recognition service provided in FIG. 17 through FIG. 19.

FIG. 20 shows a speech recognition service result provided from FIG. 17 through FIG. 19. As shown in FIG. 20, the multimedia device 1900 according to one embodiment of the present invention displays a captured image 2010 of the recognized person on a lower portion of the display together with a current broadcast screen. The captured image 2010 corresponds to the person 1801 shown in FIG. 18.

Particularly, a configuration in which only faces of the recognized persons selected based on information (target position) about positions of the persons in the captured images are displayed in a list form on the screen belong to the scope of invention.

Figure 21:
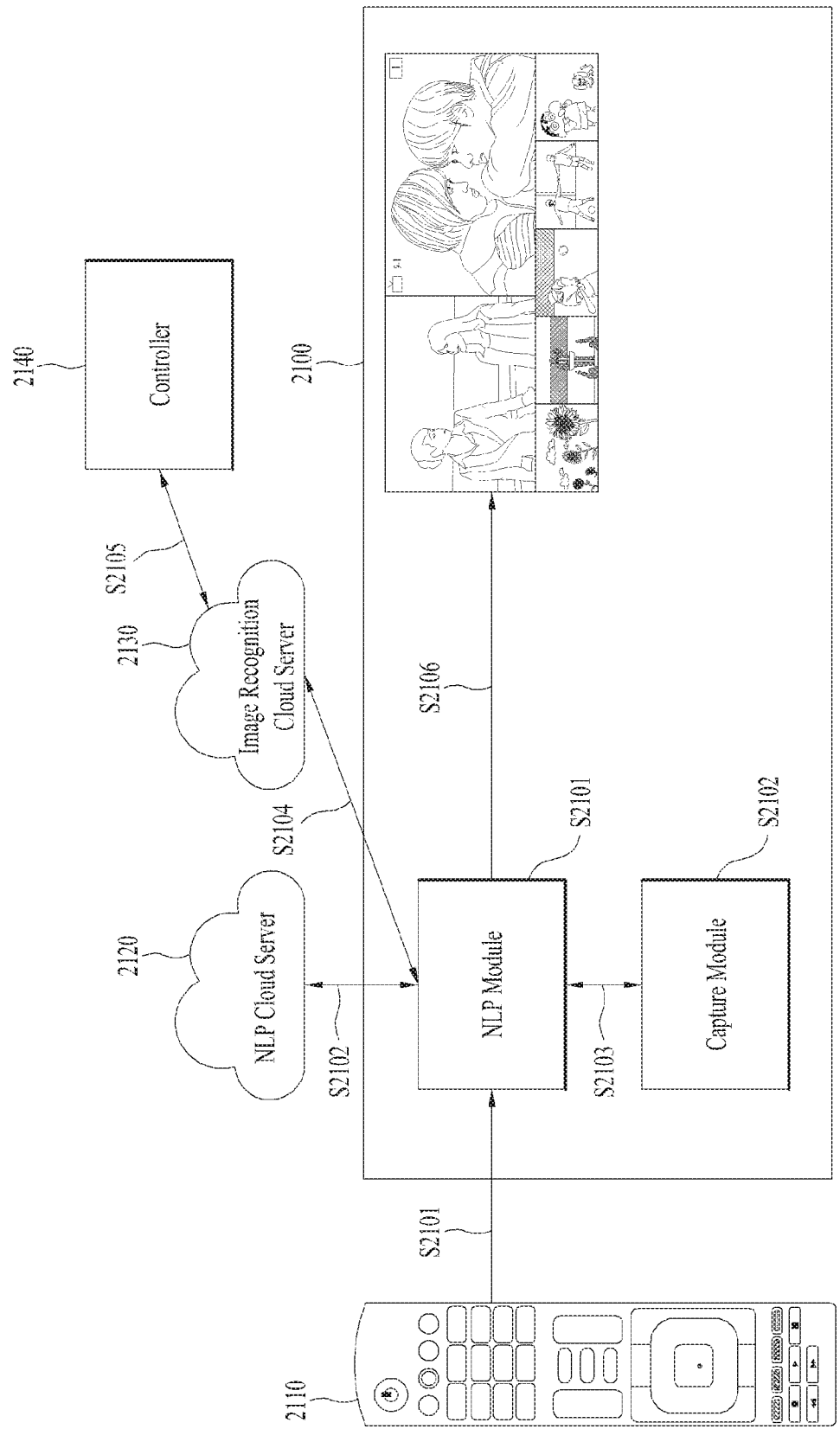
FIG. 21 shows that a controller shown in FIG. 17 is located in an external server outside a multimedia device.

FIG. 21 shows a case where the controller shown in FIG. 17 is located in an external server rather than inside the multimedia device. In contrast to the configuration of FIG. 17, in a configuration of FIG. 21, the controller is located in an external server rather than inside the multimedia device, thereby minimizing operations within the multimedia device and further, achieving a cost reduction.

A multimedia device 2100 according to one embodiment of the present invention includes an NLP module 2101, a capture module 2102, and a display. When an arbitrary speech-based command is received through the remote controller 2110, the NLP module 2101 analyzes the received speech-based command via communication with the NLP cloud server 2120. The capture module 2102 performs capturing of video data currently output on the display. The capture module transmits the captured video data to an image recognition cloud server 2130 S2104. The image recognition cloud server 2130 receives analysis result of the image via communication with the controller 2140 S2105. The image recognition cloud server 2130 delivers the analysis result to the NLP module S2104.

Then, the NLP module 2101 combines the information obtained via the communication with the servers 2120, 2130, thereby improving the accuracy of the speech recognition, in particular, determining the intention of the user speech. Then, the NLP module 2101 transmits the speech recognition result based on the intention to the display at operation S2106.

Figure 22:
FIG. 22 shows a specific object to be recognized in FIG. 23 to be described later.
Figure 23:
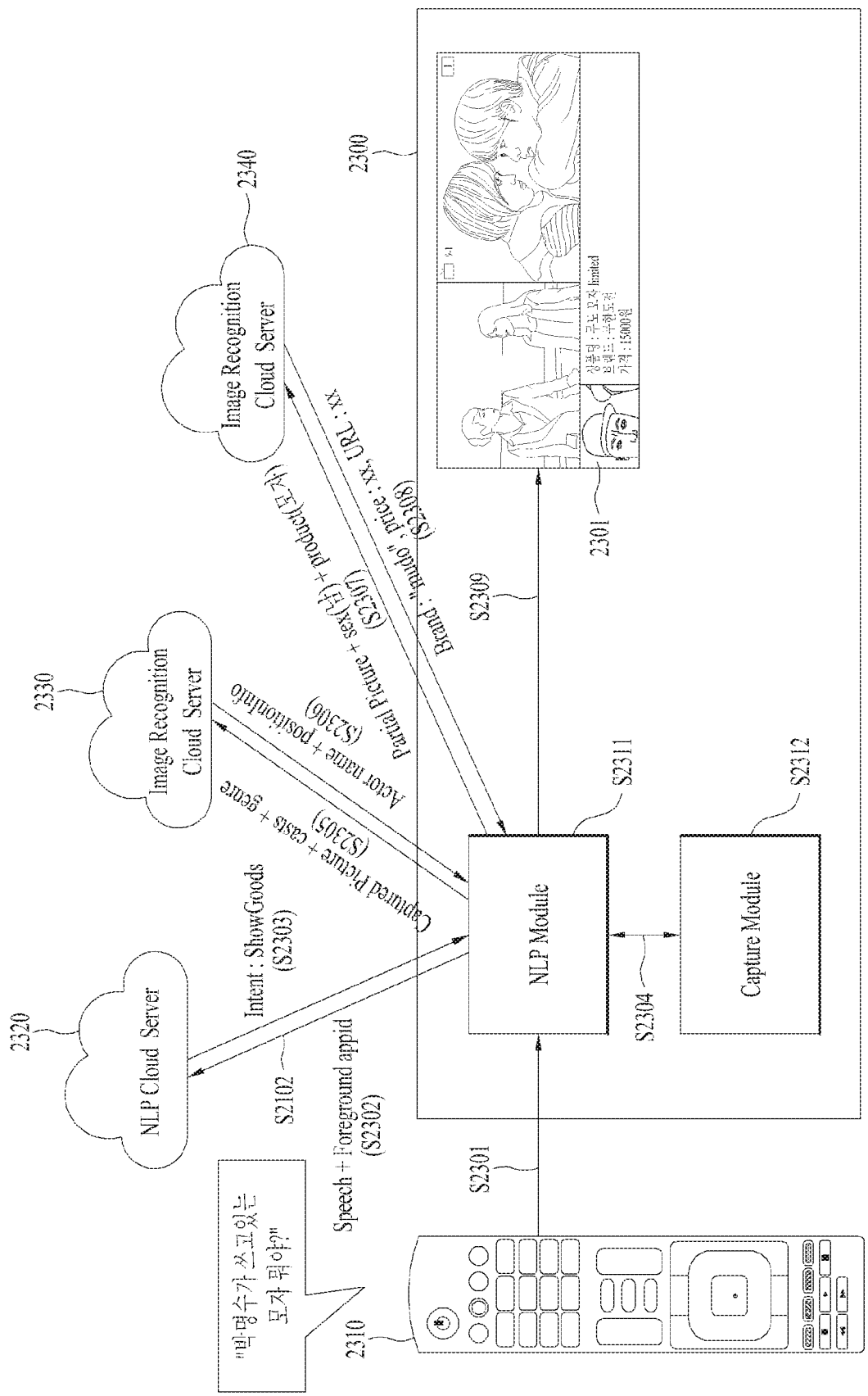
FIG. 23 shows a process by which a multimedia device can more accurately extract a specific object and intent of a user's speech using a capture scheme, according to one embodiment of the present invention.

FIG. 22 shows a specific object to be recognized in FIG. 23 below. FIG. 23 illustrates a process by which the multimedia device 2300 may more accurately extract a specific object and an intent of a user's speech using a capturing scheme in accordance with one embodiment of the present invention. In particular, unlike the previous drawings, the capturing process has been further subdivided in this figure. This removes an unnecessary capturing process and minimizes data transfer.

A speech-based command "What is a hat that Park Myung-Su is wearing?" is transmitted via the remote controller 2310 to the multimedia device 2300 at S2301. "Park Myung-Su" contained in the speech-based command is assumed to be one of the persons shown in FIG. 22.

The NLP module 2311 in the multimedia device 2300 sends to the NLP cloud server 2320 both the speech-based command received in operation S2301 and identification information (Foreground APP ID) about a currently-executed application. The module for performing the speech processing is denoted as the NLP (Natural Language Processing module) in FIG. 23 and other drawings and the present specification. The present invention is not limited thereto. The module that performs this function may be replaced with any other module capable of processing the speech.

Unlike the conventional scheme, the NLP cloud server 2320 in accordance with the present scheme determines a user's intent using the speech-based command and the identification information about the currently-executed application. The, the server 2320 transmits the determination result to the NLP module in S2303. For example, when the currently-executed application is associated with a home shopping or the like, it is determined according to the present invention that the user's intention is not to receive additional information about the corresponding hat, but to receive URL information where the corresponding hat is purchased.

The NLP module 2311 controls the capture module 2312 to capture a current screen at a time point at which the speech-based command was received or within a preset duration from the time point. Then, the module 2311 transmits the captured current screen, casting information, and genre information to the image recognition cloud server 2330 S2305. The casting information and genre information may be extracted from EPG information received from a broadcasting station or an Internet server.

The image recognition cloud server 2330 determines a name of the person currently displayed on the screen and position information of the person, using the information received in operation S2305 and transmits the name and position to the NLP module 2311 in operation S2306.

The NLP module 2311 determines a partial picture (not the entire captured image in the S2305 operation) where the specific person (for example, Park Myung-Su) is located, gender information of the corresponding person, and product information (hat information) around the corresponding person, based on the position information and the name of the person as received in the operation S2306, and the speech-based command received in operation S2301, and sends the partial picture, the gender information, and product information to another image recognition cloud server 2340 S2307. In one example, as described above, the servers 2320, 2330, and 2340 may also be combined into one or two servers.

The image recognition cloud server 2340 transmits a brand name of the corresponding merchandise (hat), price information thereof, and the URL information on which the merchandise is purchased to the NLP module 2311 at S2308.

In addition, the NLP module 2311 displays both a final recognition result and a portion of the captured image (as used in operation S2307) on a bottom 2301 of the screen that is currently outputted. As a result, this serves as a guide for facilitating user selection.

Second Embodiment (Extraction of Speech-Based Command List Corresponding to Application)

The conventional speech recognition service operates only based on commands stored in memory of a device. However, a function as provided may vary based on the application executed in the multimedia device. Therefore, the speech recognition service needs to be actively adapted to activate the varying function.

To this end, an operation in the second embodiment may be explained with reference to FIG. 13. However, a specific operation of modules constituting each embodiment is different between the two embodiments.

According to the second embodiment of the present invention, a multimedia device 1300 capable of processing a speech-based command basically includes a memory 1301, an application manager 1302 and a controller 1305. In one example, the application manager 1302 may be included in the controller 1305.

The memory 1301 stores at least one application therein.

The application manager 1302 executes an arbitrary application among the at least one application stored in the memory 1301.

Moreover, the controller 1305 receives from the application manager 1302 a list of at least one speech-based command that the currently-executed application can execute.

Further, the controller 1305 controls the network interface module 1304 to transmit any speech-based data received from the outside and the list to the server 1310.

Further, based on a feedback result value received from the server 1310 via the network interface module 1304, the controller 1305 controls the currently-executed application or executes a function non-specific to the currently-executed application. This configuration may be embodied via operations S2507-1 and S2507-2 of FIG. 25 which will be described below.

Further, for example, a condition that a command corresponding to a specific shortcut key is received from the remote controller may be configured as an application execution triggering condition. When the triggering condition is met, the controller 1305 requests to the application manager 1302 a list of at least one speech-based command which the currently-executed application can execute.

The application manager 1302 reports to the controller that a speech recognition service mapped to the currently-executed application is enabled when the application is executed.

Further, the list of at least one speech-based command that can be executed by the currently-executed application may be changed based on the currently displayed screen as well as the type of the currently-executed application.

The controller 1305 may be configured to output an OSD that inquires whether to control the currently-executed application or execute a function non-specific to the currently-executed application, regardless of the feedback result value as received from the server 1310 via the network interface module 1304. This will be described below with reference to FIGS. 26 and 27.

The multimedia device of the second embodiment described above and the multimedia device 1300 of FIG. 13 correspond to at least one of, for example, a set top box (STB), a digital television (DTV), or a mobile device.

Referring to FIGS. 24 to 27, the second embodiment as described above will be described in more detail below. The second embodiment may be interpreted with reference to the previous figures, particularly, the block diagram of FIG. 13.

Figure 24:
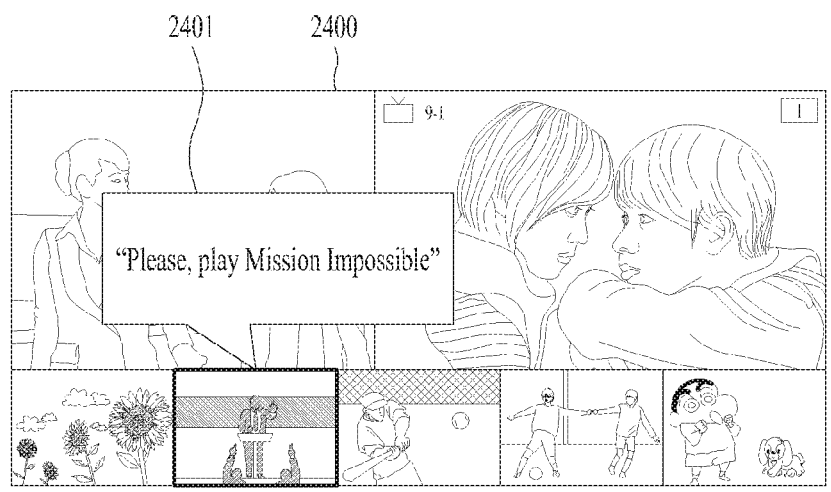
FIG. 24 shows a case in which a multimedia device receives a first speech-based command while an arbitrary application is being executed according to one of the other embodiments of the present invention.

FIG. 24 shows a case in which the multimedia device receives a first speech-based command in a state in which an application is executed according to another embodiment of the present invention.

In another embodiment (second embodiment) of the present invention, it may be assumed that the multimedia device 2400 is executing an application, for example, a VOD service.

It is additionally assumed that a first speech-based command (e.g., "Play Mission Impossible") shown in FIG. 24 is recognized by the multimedia device 2400. In this regard, the above-described first speech-based command may be, for example, a command related or specific to the currently-executed application, but not related or specific to a unique function of the multimedia device 2400. However, an approach to a case in which a speech-based command recognized by the multimedia device is associated with both of a function specific to the currently-executed application and a function unique to the multimedia device will be described later with reference to FIG. 27 and FIG. 28.

According to the conventional scheme, a problem occurs that even when the multimedia device 2400 recognizes the first speech-based command, the controller does not know whether to transmit a specific command mapped to the first command to the application manager. A solution to solve this problem will be described with reference to FIG. 25 below.

Figure 25:
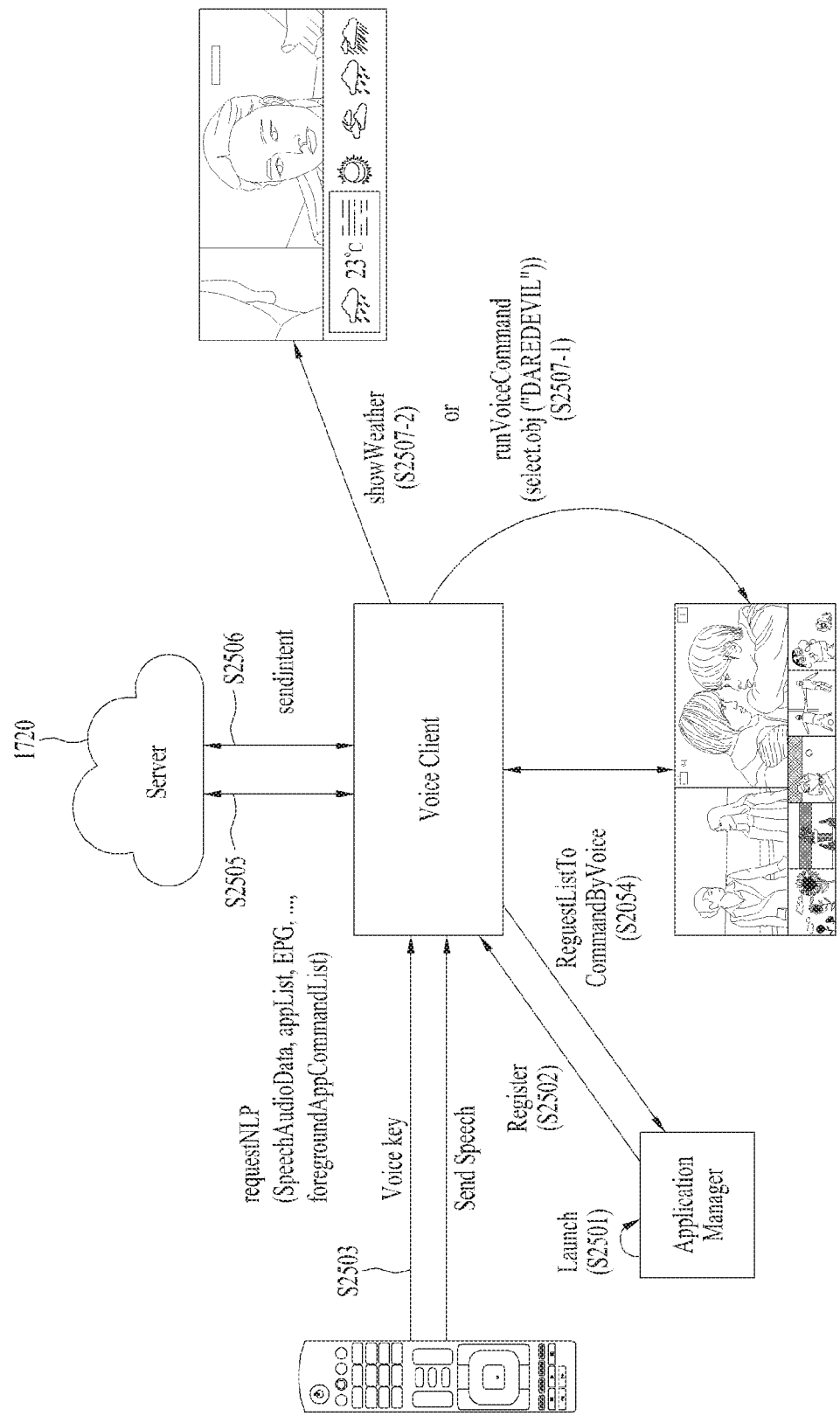
FIG. 25 details a process by which a multimedia device processes the first speech-based command while an arbitrary application is being executed, according to another embodiment of the present invention.

FIG. 25 shows in detail a process by which the multimedia device processes a first speech-based command when an application is executed according to another embodiment of the present invention.

A voice client and the application manager shown in FIG. 25 are both included in the multimedia device as described above. More specifically, the voice client and the application manager are included in the controller shown in FIG. 13. Furthermore, FIG. 25 shows the voice client and application manager as separate modules. However, a configuration that the voice client and application manager are combined into a single module is also within the scope of the present invention.

When the application manager receives a command for launching an arbitrary application S2501, the application manager registers with the voice client a fact that the currently-executed application is capable of executing a speech-based command S2502. Therefore, there is an advantage that, thereafter, the operation S2502 may be omitted.

The operation S2502 will be described in more detail. The application manager reports to the voice client that a speech recognition service mapped to a currently-executed application is available when the application is executed.

When the voice client receives a key button signal for executing a speech-based command from the remote controller and the corresponding speech-based command, the voice client transmits a request signal to the application manager at S2504. The request signal may be used, for example, to request a list of voice-recognized commands that can be executed by the currently-executed application.

In one example, in FIG. 25, it is illustrated that when the above-described S2503 operation is triggered, the S2504 operation is initiated. It is also within the scope of the present invention that the S2503 operation is omitted and the S2504 operation is enabled. In this case, there is a technical effect that the application can process the speech-based command more quickly.

In response to the operation S2504, the application manager provides the voice client with a list of at least one speech-based command that can be executed by the currently-executed application.

The voice client controls the above-described network interface module to transmits the speech-based data as received in the operation S2503 together with the list to the server in operation 52505.

In the above-described operation S2504 and operation 52505, the list of at least one speech-based command that can be executed by the currently-executed application may vary depending on the type (identification information) of the currently-executed application and the currently-displayed screen.

For example, it may be assumed that any application described in FIG. 25 is a VOD-related application. On the home screen of the VOD-related application, main options are provided for selecting a genre. In this connection, when the user selects a specific genre, sub-options are provided. Thus, there is no need to provide the voice client with a list of speech commands to execute the sub option on the home screen. That is, when the same application is being executed, a minimum speech-based command-related list may be communicated in accordance with the screen (type of the option) as currently provided. Thus, there is a technical effect that this can eliminate unnecessary data processing.

The voice client receives a feedback result value from the server via the network interface module S2506. Based on the received feedback result value, the voice client controls the currently-executed application in operation S2507-1 or executes a function non-specific to the currently-executed application in operation S2507-2.

More specifically, the speech-based command "Execute DAREDEVIL" is received while the VOD application is executed. In this case, the multimedia device according to the conventional scheme has never received a command list executable by the VOD application therefrom, the content corresponding to the command cannot be executed by the device.

In contrast, in accordance with the second embodiment shown in FIG. 25, the device has already received a list of speech-based commands that the VOD related application is expected to or can execute. Thus, the device can immediately execute "DAREDEVIL". In one example, when a speech-based command (e.g., "Show Weather) that is not specific to the currently-executed VOD application is received, the device can directly perform a function corresponding to the command. However, when the received speech-based command is a function specific to both of the multimedia device and the currently-executed VOD application, a problem may arise.

The solution to solve this will be described below with reference to FIG. 26 and FIG. 27.

Figure 26:
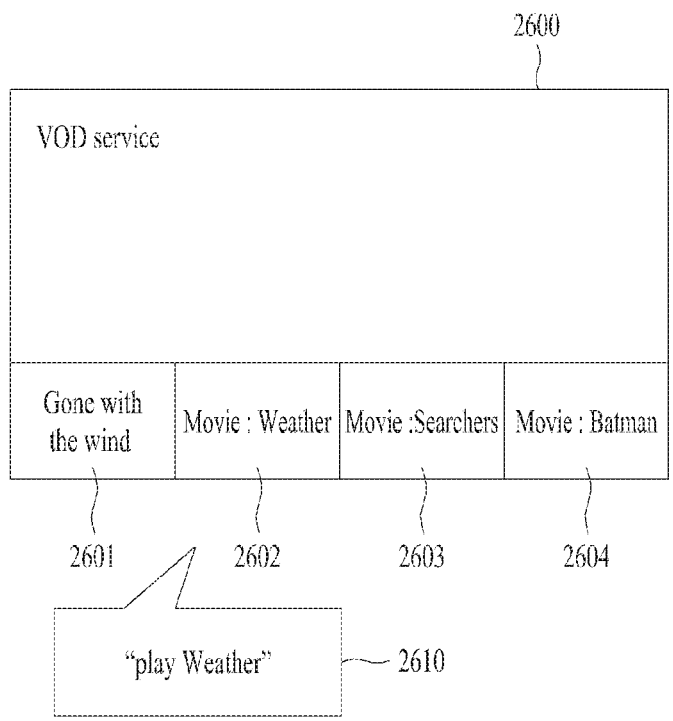
FIG. 26 shows a case in which a multimedia device receives a second speech-based command while an arbitrary application is being executed according to another embodiment of the present invention.

FIG. 26 shows a case in which a multimedia device receives a second speech-based command while an application is in an executed state according to another embodiment of the present invention.

The first speech-based command described in the previous figures is specific to the currently-executed application and is not the unique function of the multimedia device. In contrast, the second speech-based command described in FIG. 26 and FIG. 27 is a command specific to both the currently-executed application as well as the multimedia device. Therefore, a solution is needed to solve conflict between the execution of the command by the currently-executed application and the execution thereof by the multimedia device.

More specifically, as shown in FIG. 26, it is assumed that the multimedia device 2600 according to the second embodiment of the present invention is currently executing a VOD (Video On Demand) application.

In this connection, four options for the above VOD application that can be selected using a voice may be provided on the current screen. In FIG. 26, by way of example, the four options including "Gone with the wind" 2601, "Weather" 2602, "Searchers" 2603, and "Batman" 2604" are shown. All of the four options are movie titles.

The speech-based command 2610 "Play Weather" via a remote controller or a microphone of a multimedia device 2600 may be received. Then, according to the previous first embodiment, the movie title "Weather" 2602 is played. However, even when the VOD application is executed, the intention of the user of the multimedia device 2600 is not to execute the movie title 2602, but is to request information about the current weather in the current area. The UX/UI menu for considering this situation will be described in detail with reference to FIG. 27 below.

Figure 27:
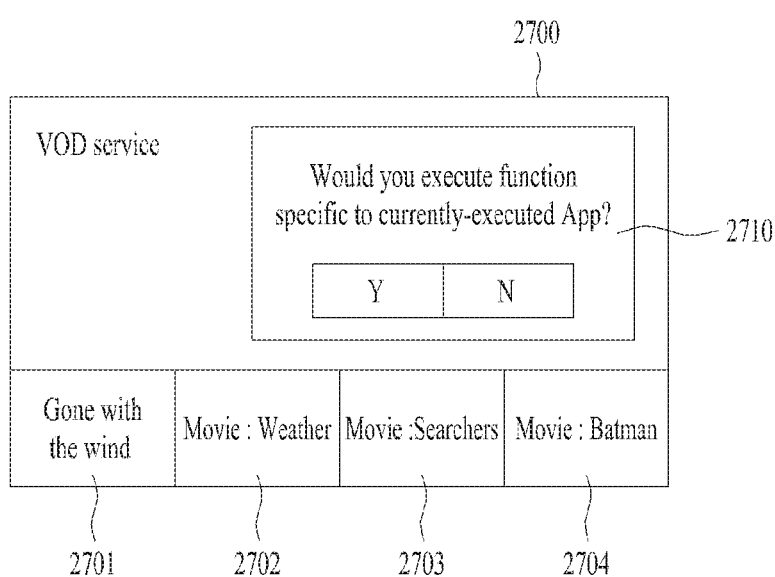
FIG. 27 details a process by which a multimedia device processes the second speech-based command, with an arbitrary application is being executed, according to another embodiment of the present invention.

In addition, FIG. 27 shows a process by which a multimedia device processes a second speech-based command when an application is in an executed state, according to another embodiment of the present invention.

As shown in FIG. 27, the multimedia device 2700 according to the second embodiment (referred to as "another embodiment" as used herein) may be configured to output an OSD (On Screen Display) 2710 that queries whether to control the currently-executed application (VOD-related application) or to execute a function non-specific to the currently-executed application (VOD-related application).

The conditions under which the OSD 2710 is displayed include the following two conditions according to the present invention.

First, a first suggestion is considered in order to more accurately reflect the user intention. That is, when the recognized speech-based command exists in the list provided by the application manager (that is, belongs to the command type that can be executed using the speech command), the above-described OSD 2710 is displayed.

Alternatively, a second suggestion is contemplated to prevent situations where an unnecessary OSD is provided. When both of the first condition that the recognized speech-based command exists in the list provided by the application manager (for example, the command belongs to a speech-based command type for selecting the option 2701, 2702, 2703, or 2704 as shown in FIG. 27) and a second condition that the recognized speech-based command is directed to performing a function unique to the multimedia device are satisfied, the above-described OSD 2710 is displayed.

In one example, both the first and second suggestions fall within the scope of the present invention, and combinations and modifications thereof are possible.

The digital device and the content processing method of the digital device according to the foregoing embodiments are not restricted to the embodiments set forth herein. Therefore, variations and combinations of the exemplary embodiments set forth herein may fall within the scope of the present invention.

The method for operating the digital device according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave (e.g., data transmission over the Internet). The computer-readable recording medium may be distributed over a plurality of computer systems connected to a network so that computer-readable code is written thereto and executed therefrom in a decentralized manner. Functional programs, code, and code segments to realize the embodiments herein can be construed by one of ordinary skill in the art Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multimedia device capable of processing a recognized speech-based command, the device comprising:
   a memory to store multiple applications;
   an application manager for executing a specific application to be currently-executed among the multiple applications stored in the memory; and
   a controller configured to:
   receive from the application manager a list of at least one predetermined speech-based command that is predetermined as being escapable of being processed by the specific application, wherein the list changes depending on the specific application being currently-executed;
   control a network interface module to transmit both speech-based data received from an outside and the list of the at least one predetermined speech-based command that is predetermined as being capable of being processed by the currently-executed specific application to a server; and
   control the currently-executed specific application based on a feedback result value received from the server via the network interface module.

2. The multimedia device of claim 1, the controller is configured to request the list of the at least one predetermined speech-based command that is predetermined as being capable of being executed by the currently-executed specific application when an application execution triggering condition is satisfied via a shortcut key from a remote controller.

3. The multimedia device of claim 1, the application manager reports to the controller that a speech recognition service mapped to the currently-executed specific application is available when the specific application is executed.

4. The multimedia device of claim 1, wherein the controller is configured to output an On Screen Display (OSD) querying whether to control the currently-executed specific application regardless of the feedback result value received from the server via the network interface module.

5. The multimedia device of claim 1, wherein the multimedia device includes a set top box (STB), a digital television (DTV), and/or a mobile device.

6. A method for controlling a multimedia device capable of processing a recognized speech-based command, the method comprising:

executing a specific application to be currently-executed among multiple applications stored in a memory;

receiving from the application manager in the device a list of at least one predetermined speech-based command that is predetermined as being capable of being processed in the currently-executed specific application, wherein the list changes depending on the specific application being currently-executed;

transmitting both speech-based data received from an outside and the list of the at least one predetermined speech-based command that is predetermined as being capable of being processed by the currently-executed specific application to the server; and controlling, by a controller, the currently-executed specific application based on a feedback result value received from the server via the network interface module.

7. The method of claim 6, wherein the method further comprises:

requesting the list of the at least one predetermined speech-based command that is predetermined as being capable of being executed by the currently-executed specific application when an application execution triggering condition is satisfied via a shortcut key from a remote controller.

8. The method of claim 6, wherein the method further comprises:

reporting, by the application manager, to the controller that a speech recognition service mapped to the currently-executed specific application is available when the specific application is executed.

9. The method of claim 6, wherein the method further comprises outputting an On Screen Display (OSD) querying whether to control the currently-executed specific application regardless of the feedback result value received from the server via the network interface module.

10. The method of claim 1, wherein the multimedia device includes a set top box (STB), a digital television (DTV), and/or a mobile device.

* * * * *